(12) United States Patent
Ohtake

(10) Patent No.: US 6,333,822 B1
(45) Date of Patent: Dec. 25, 2001

(54) VARIABLE FOCAL LENGTH LENS SYSTEM

(75) Inventor: Motoyuki Ohtake, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/634,855

(22) Filed: Aug. 8, 2000

(30) Foreign Application Priority Data

Aug. 9, 1999 (JP) .................................. 11-225544
Jul. 24, 2000 (JP) .................................. 12-221848

(51) Int. Cl.$^7$ .............................. G02B 15/14; G02B 9/00
(52) U.S. Cl. ...................... 359/684; 359/676; 359/689; 359/716; 359/740; 359/739; 359/791
(58) Field of Search .................... 359/676, 684, 359/689, 716, 740, 739, 791

(56) References Cited

U.S. PATENT DOCUMENTS

| | | | |
|---|---|---|---|
| 4,124,274 | * 11/1978 | Tanaka et al. | 359/684 |
| 4,963,006 | * 10/1990 | Inadome | 359/684 |
| 5,786,941 | * 7/1998 | Kuwana et al. | 359/683 |
| 5,887,202 | * 3/1999 | Ohtake et al. | 396/86 |
| 6,031,669 | * 2/2000 | Ohtake | 359/687 |
| 6,108,137 | * 8/2000 | Ohtake | 359/695 |

FOREIGN PATENT DOCUMENTS 7-151952    6/1995   (JP) .

* cited by examiner

Primary Examiner—Evelyn A Lester
(74) Attorney, Agent, or Firm—Miles & Stockbridge P.C.

(57) ABSTRACT

A variable focal length lens system includes at least three lens groups, in order from an object side, a first lens group G1, a second lens group G2, and a third lens group G3. When the lens group positions are changed from a wide-angle end state to a telephoto end state, each lens group moves from a state focused at infinity to a state focused at near object, in order from a state focused at infinity in the wide-angle end state to a state focused at near object in the telephoto end state. G2 has an aperture diaphragm S, and lens elements are arranged to both object and image side of the aperture diaphragm S. When the lens group positions are changed from the wide-angle end state to the telephoto end state, G1 and G2 moves such that a moving ratio of G2 to G1 is always same, and G3 moves such that a space between G2 and G3 increases when a focusing state in a predetermined focal length changes from infinity to near object, and the space decrease when a focusing state and a focal length state change from near object in the predetermined focal length state to infinity in the next focal length state.

20 Claims, 18 Drawing Sheets

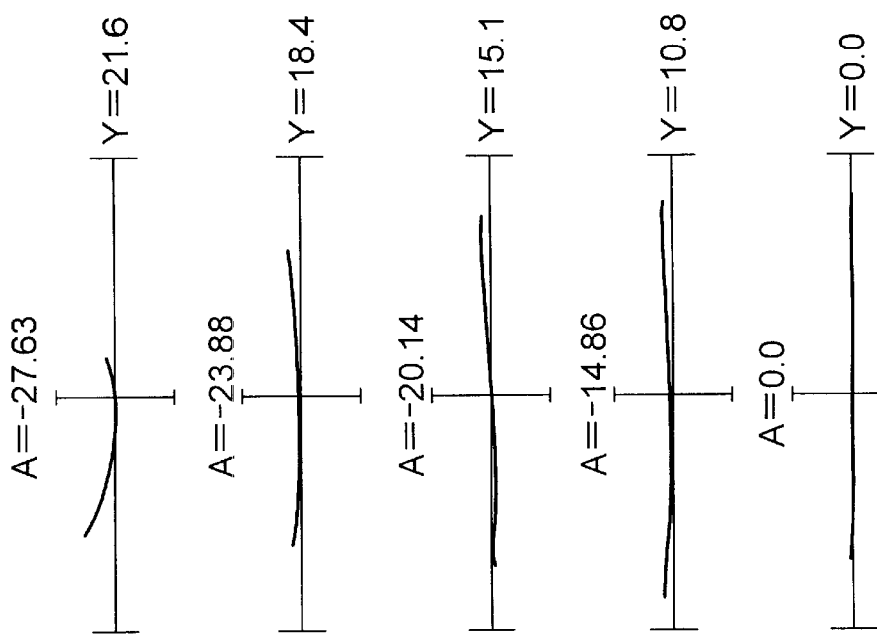
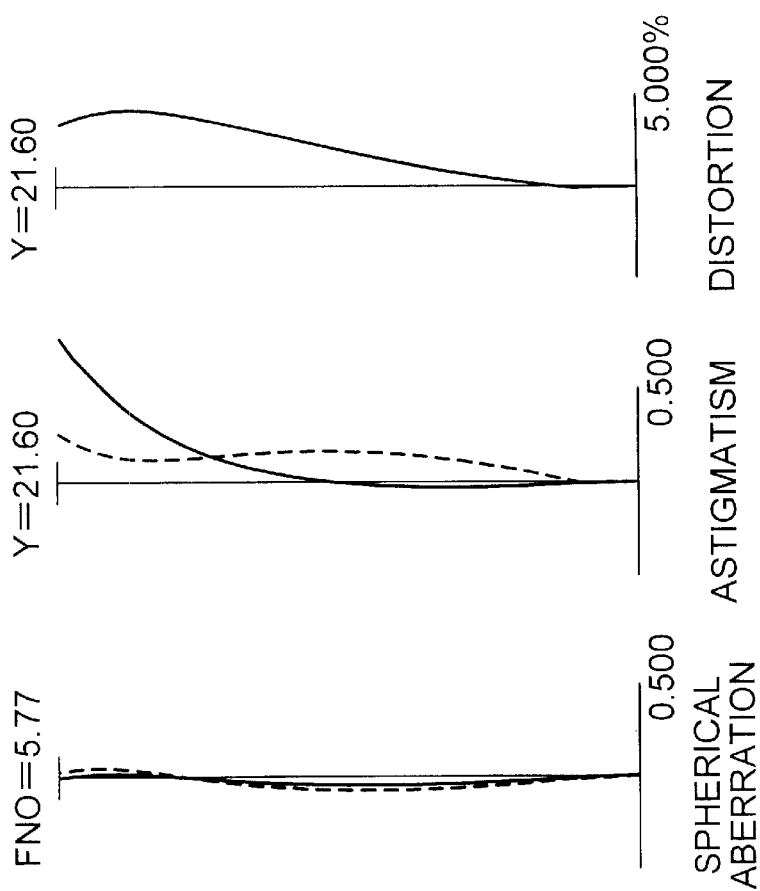
FIG.4A  FIG.4B  FIG.4C  FIG.4D

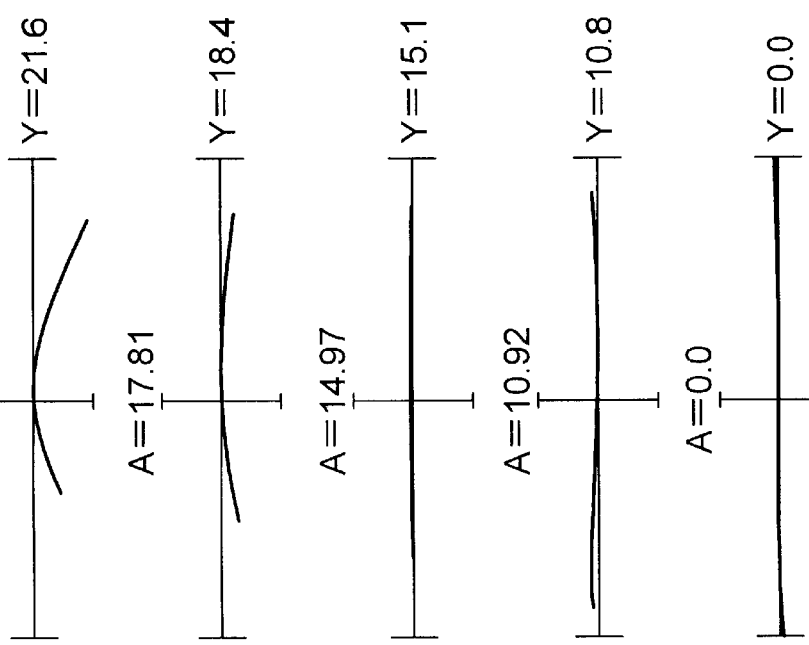
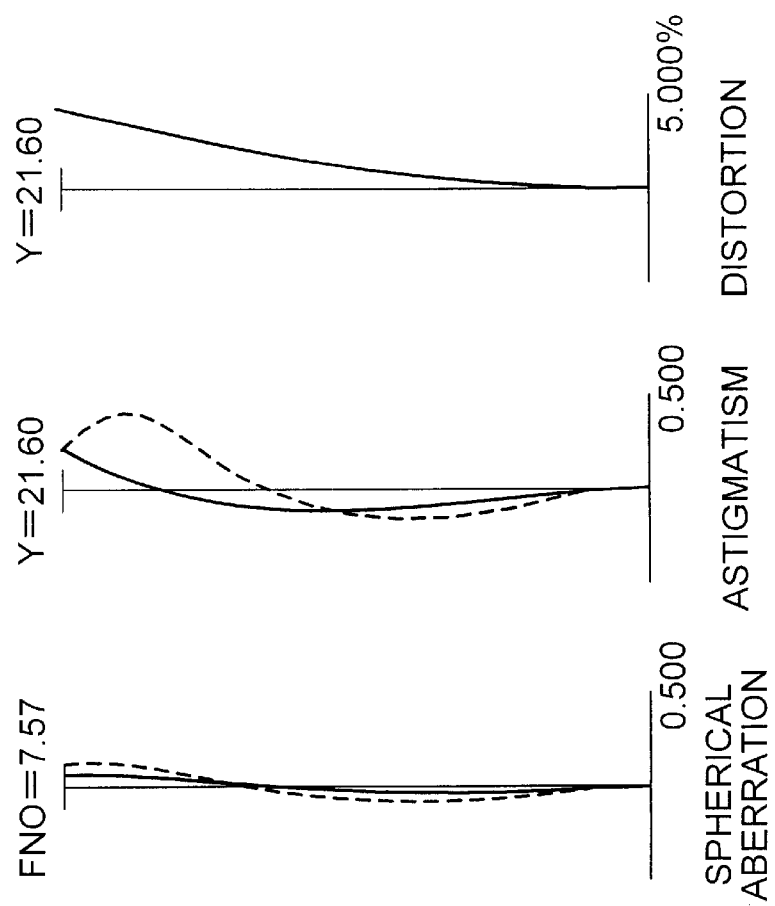
FIG.5A  FIG.5B  FIG.5C  FIG.5D

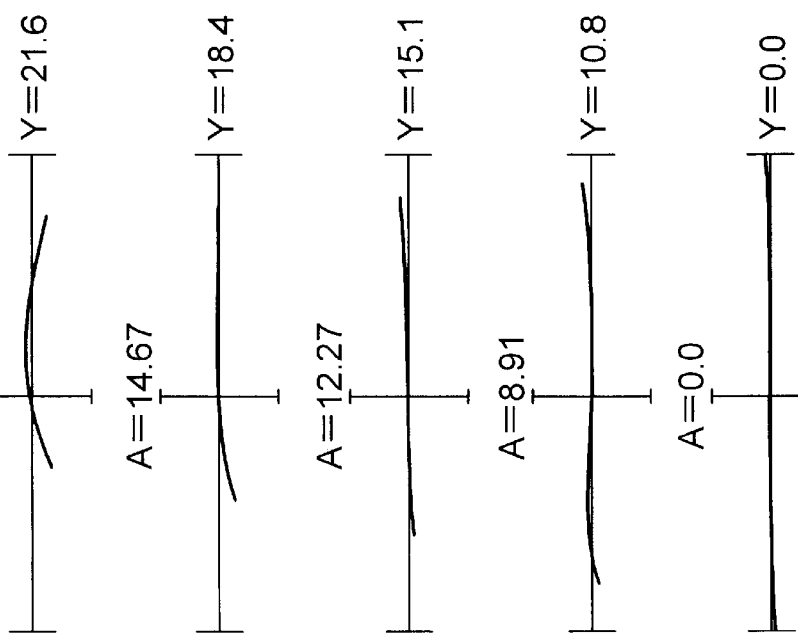
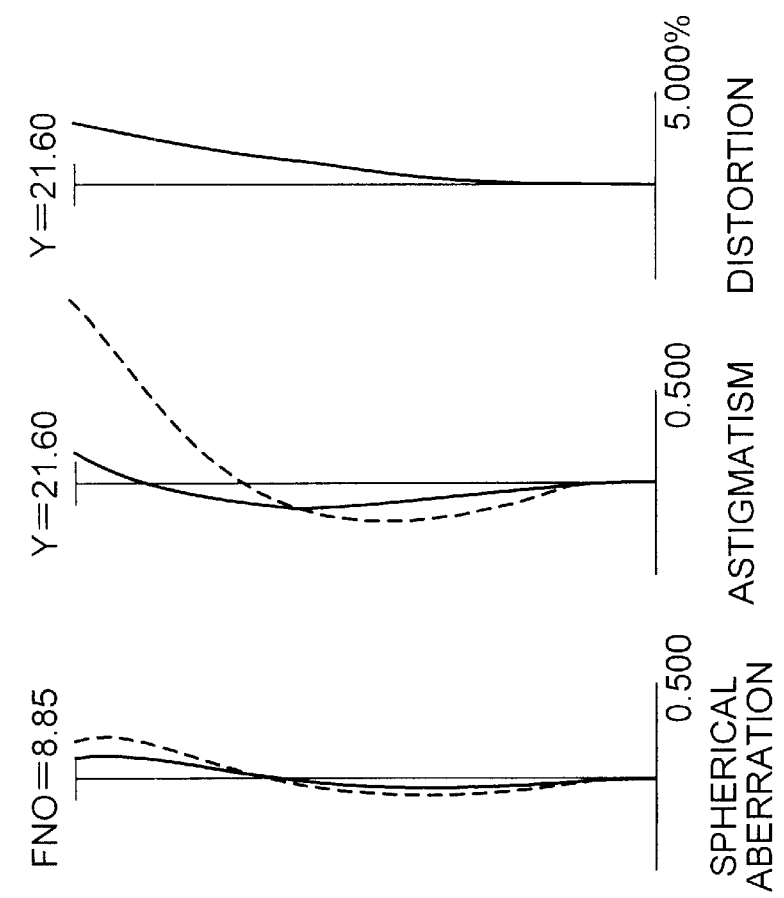
FIG.6A  FIG.6B  FIG.6C
FIG.6D

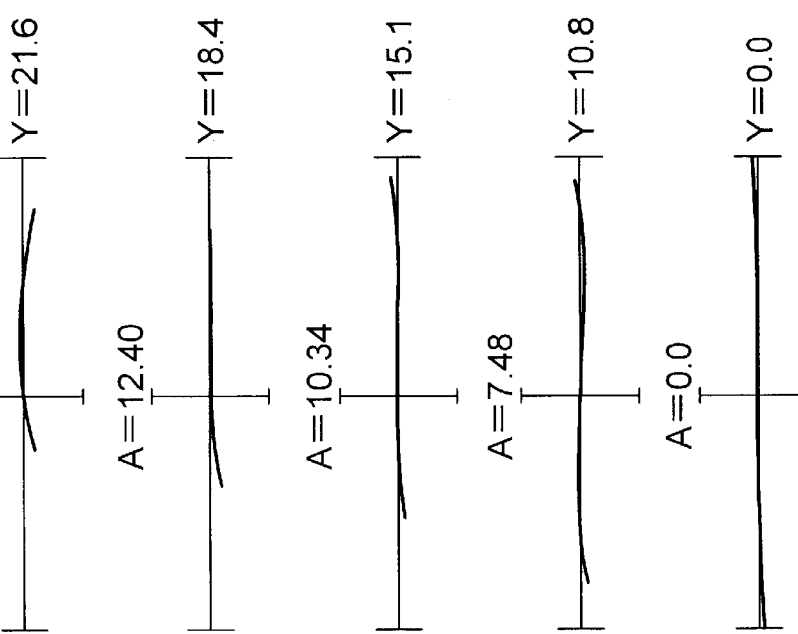
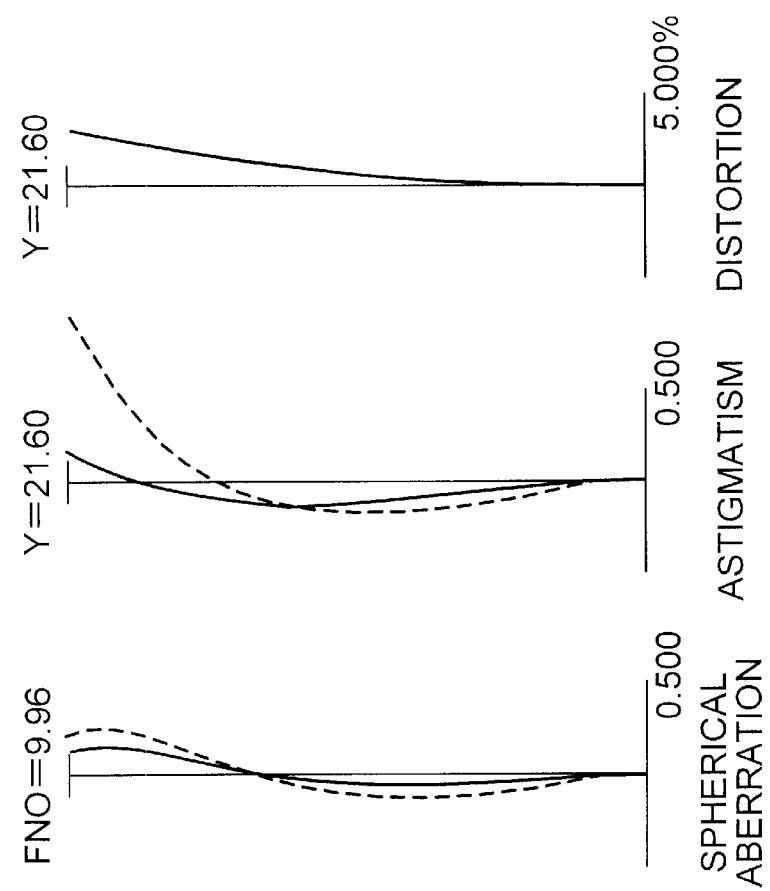
FIG.7A  FIG.7B  FIG.7C  FIG.7D

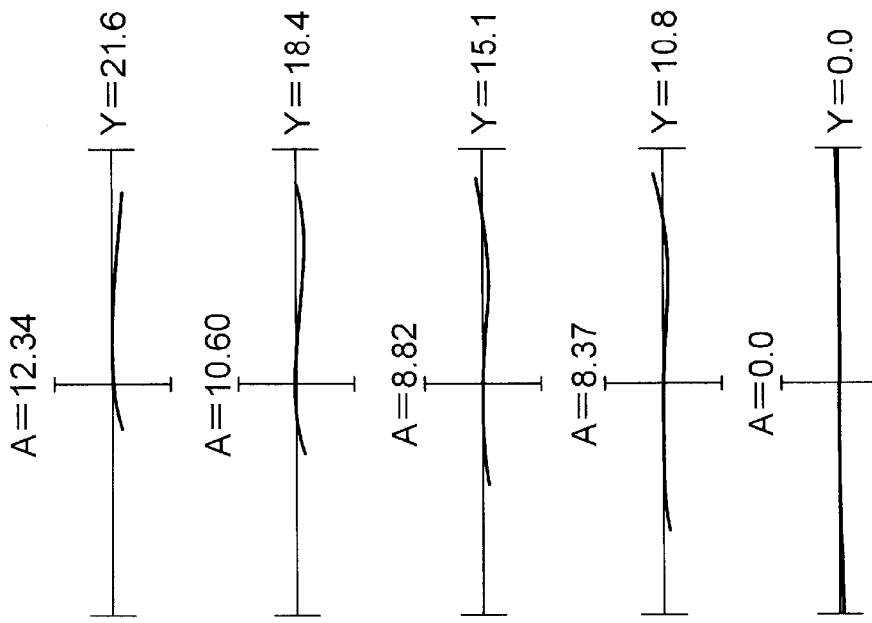
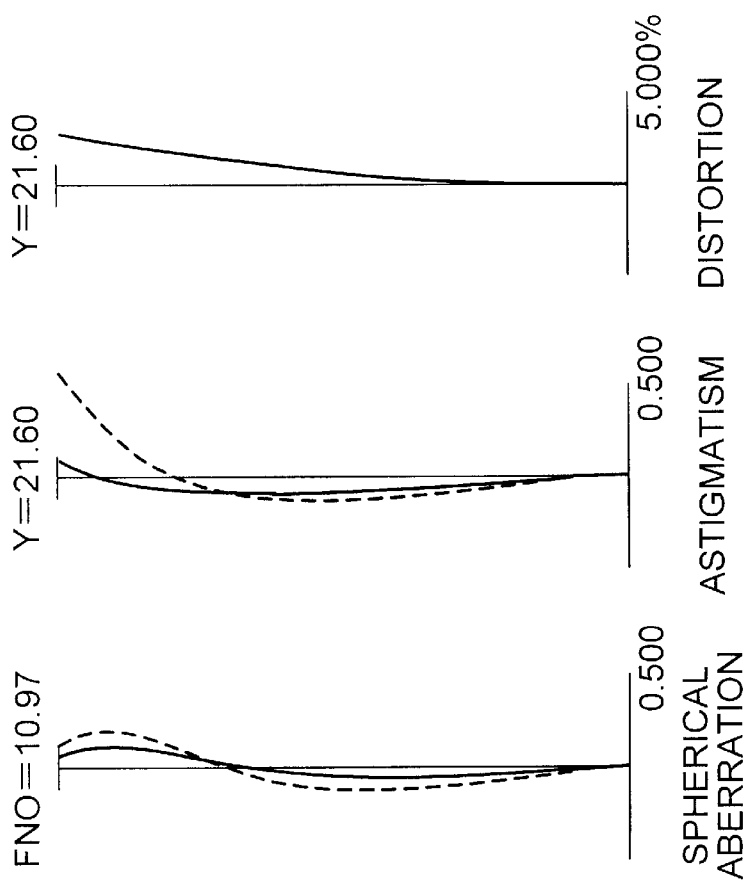
FIG.8A  FIG.8B  FIG.8C
FIG.8D

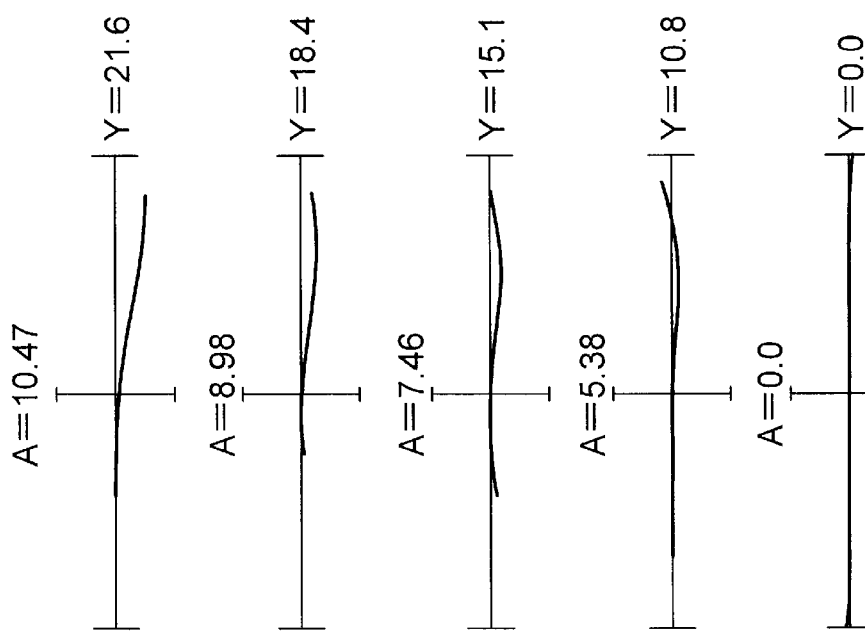
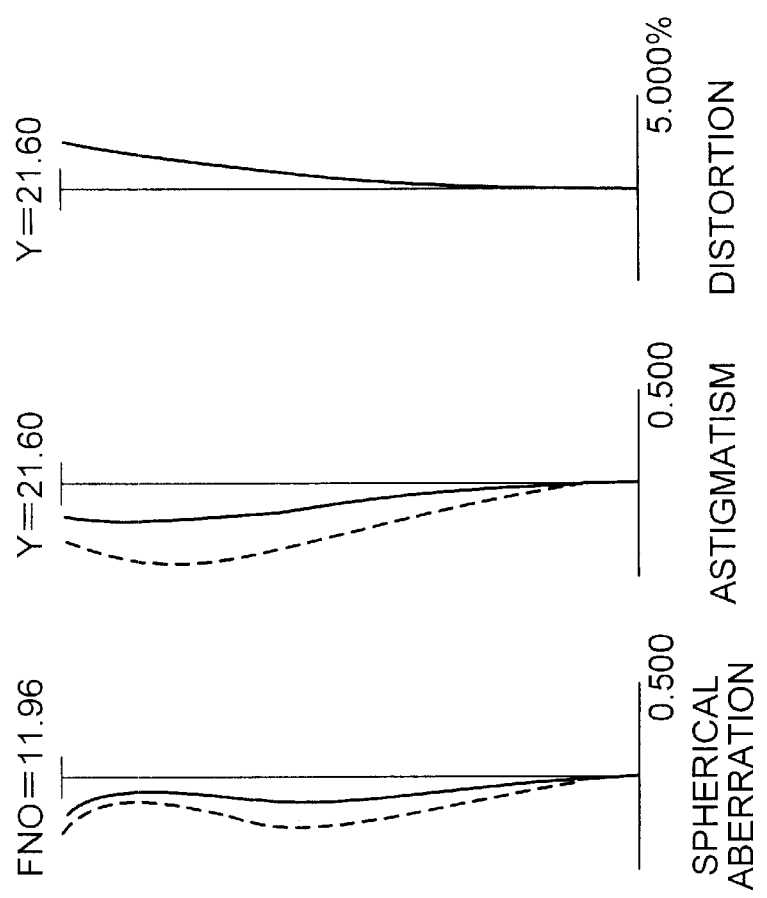

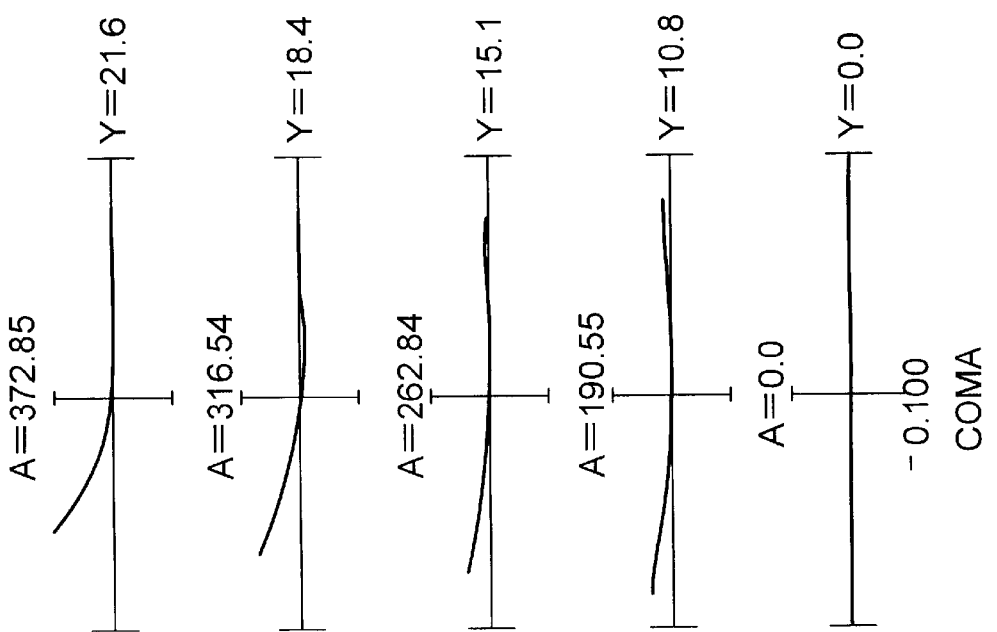
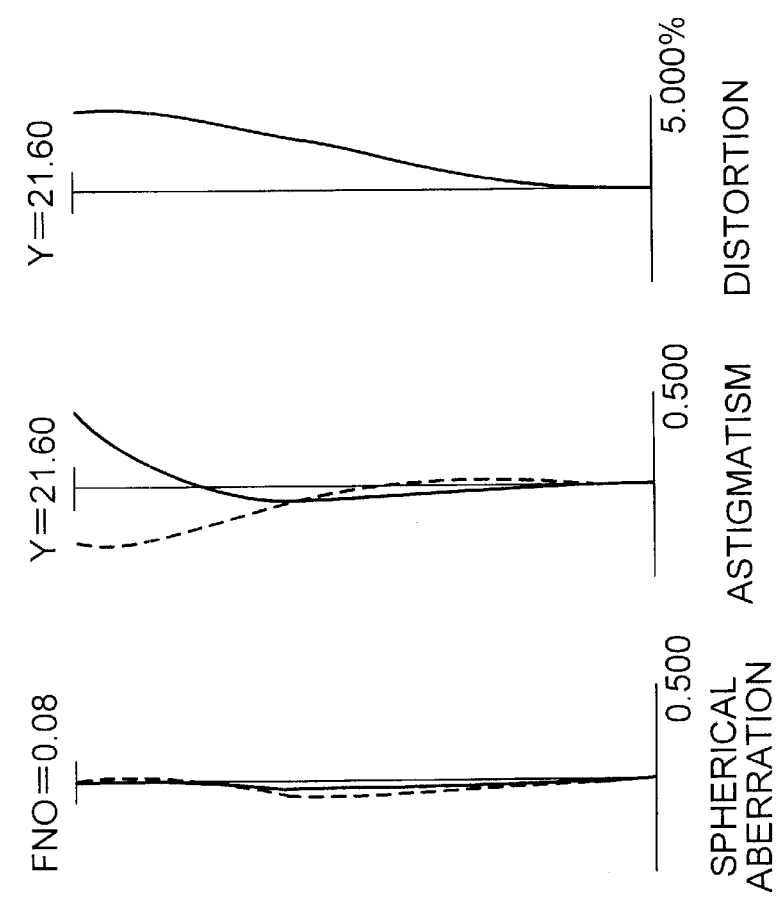
FIG.10A  FIG.10B  FIG.10C  FIG.10D

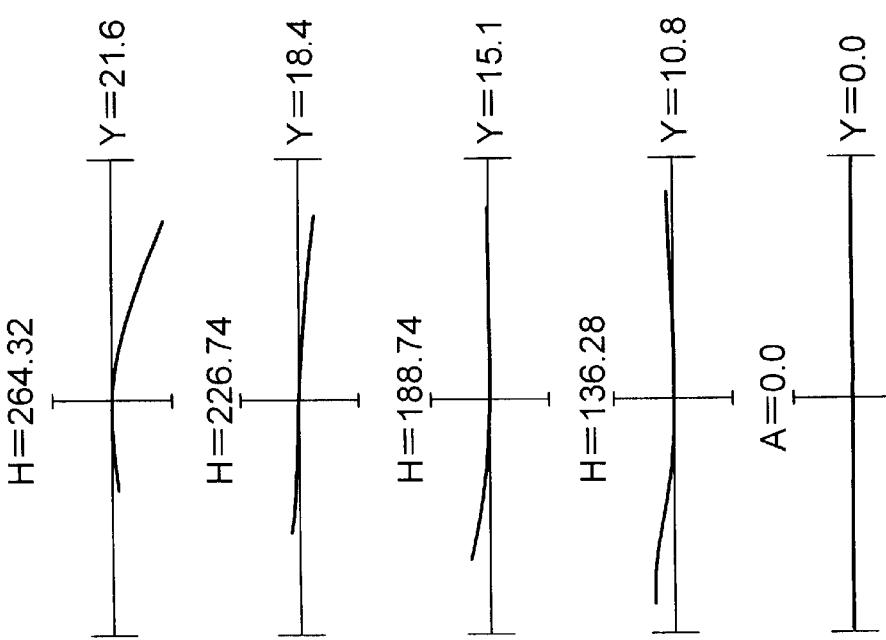
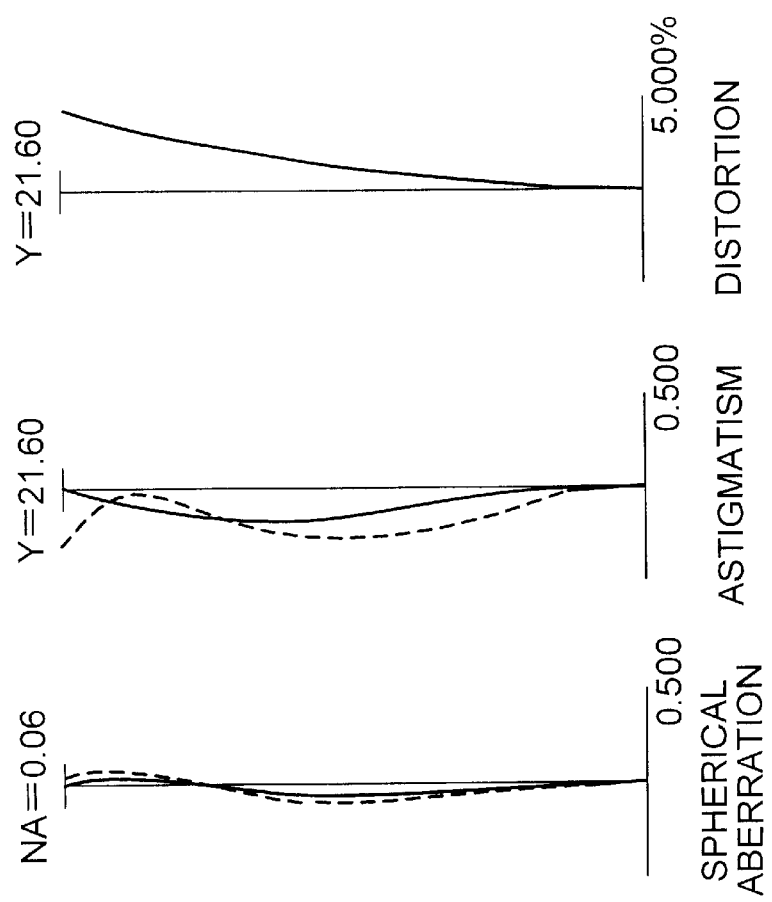
FIG.11A  FIG.11B  FIG.113C  FIG.11D

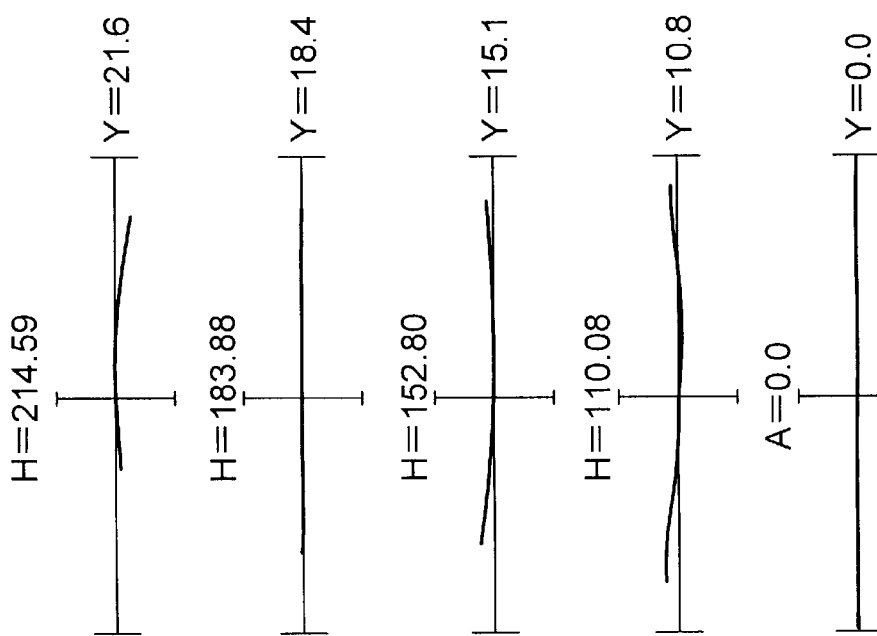
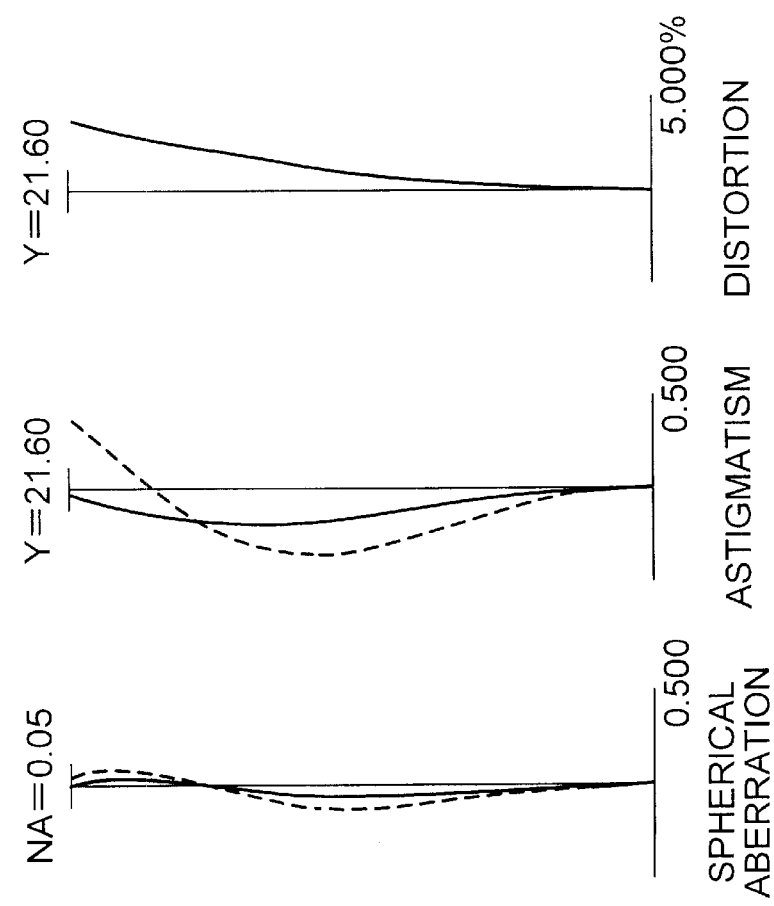
FIG.12A  FIG.12B  FIG.12C  FIG.12D

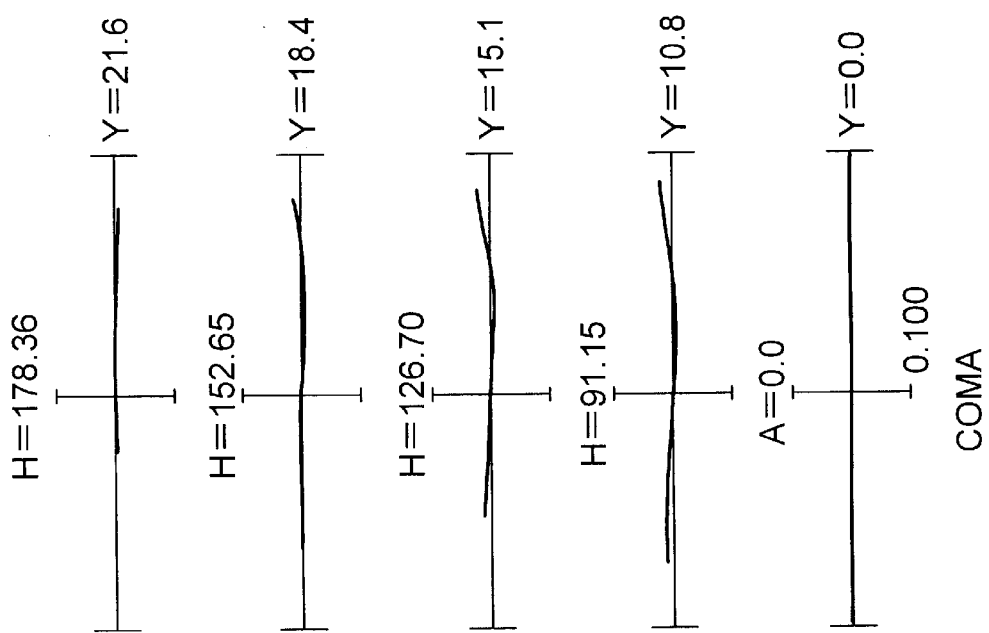
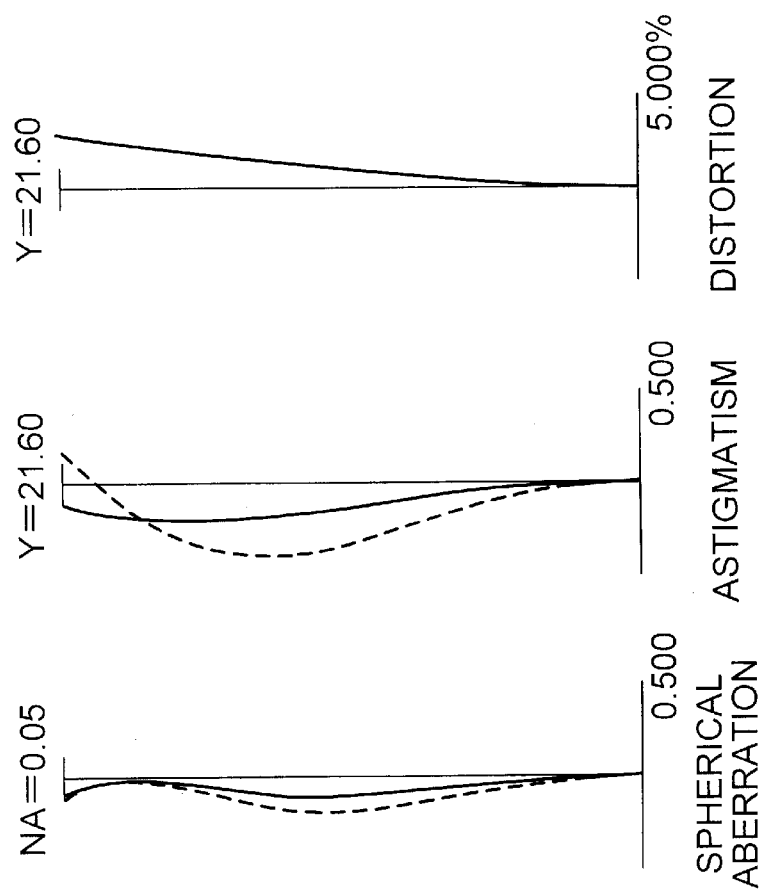
FIG.13A  FIG.13B  FIG.13C  FIG.13D

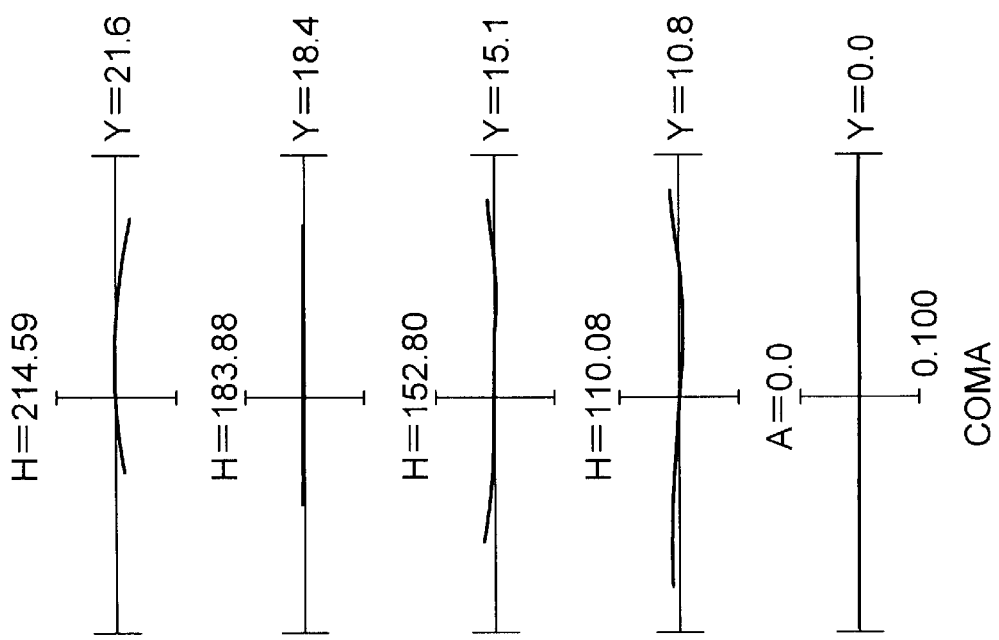
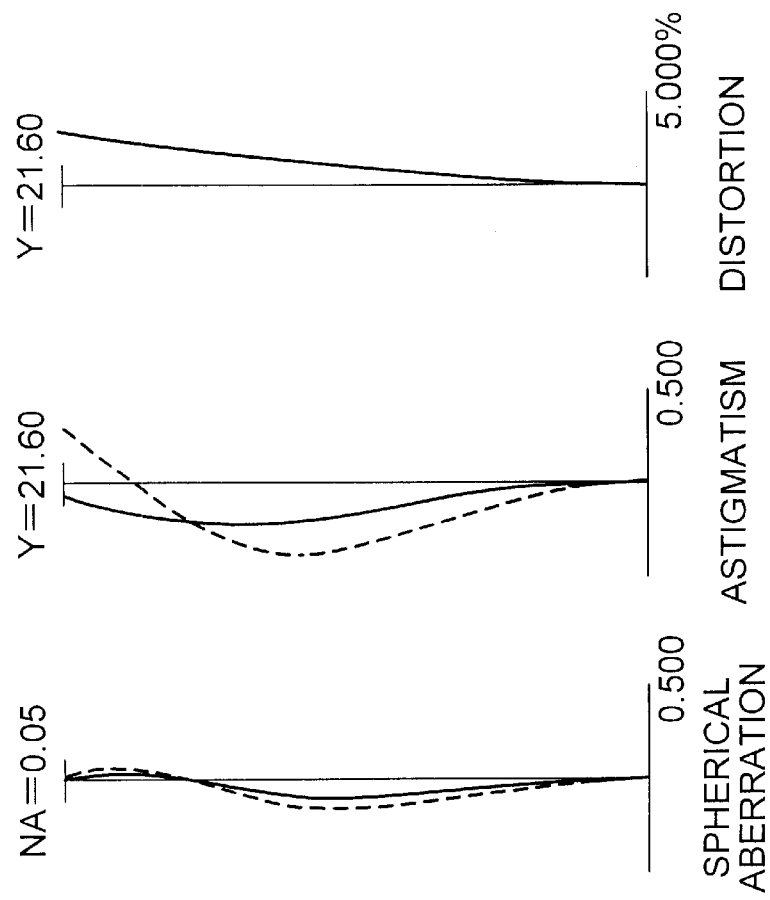
FIG.14A   FIG.14B   FIG.14C   FIG.14D

VARIABLE FOCAL LENGTH LENS SYSTEM

The disclosure of the following priority applications are herein incorporated by reference: Japanese Patent Application No. 11-225544 filed Aug. 9, 1999 Japanese Patent Application No. 2000-221848 filed Jul. 24, 2000

FIELD OF THE INVENTION

The present invention relates to a variable focal length lens system and, in particular, to a variable focal length lens system having simplified lens barrel structure and compactness.

BACKGROUND OF THE INVENTION

The primary marketing need for a lens shutter type camera has been good portability. In order to improve portability (we define it as lightweight and compactness), it is important to make shorten the total length of the picture-taking lens and to make miniaturize the diameter of the lens. It has recently become common to use a zoom lens in a picture-taking lens used for a lens shutter type camera. A zoom lens has a merit for a photographer to make it possible to take picture at will in accordance with variation of focal length. In particular, a camera including a high zoom ratio zoom lens having a zoom ratio of more than three is now typical.

As such a high zoom ratio lens, a zoom lens configured such that three or more lens groups are moved when the focal length is changed, has typically been used. In particular, a three-lens-group type having relatively small number of lens groups such as positive, positive, and negative (a lens type consisting of, in order from object side, a positive lens group, a positive lens group, and a negative lens group) has mainly been used.

There has been known following two focusing method for a lens shutter type camera, (1) and (2):

(1) A method for driving a focusing lens unit along the optical axis, wherein the focusing lens unit is holded by a shutter unit having a focus actuator which drives the focusing lens unit along the optical axis.

(2) A method for driving a focusing lens unit of a zoom lens along the optical axis, wherein the focusing lens unit is driven by a motor for both zooming and focusing along a trajectory of the focusing lens unit recorded on a cam by using a step type zoom lens stopping only at a plurality of predetermined lens positions. This method is disclosed, for example, in the Japanese Patent Publication No. 7-151952.

In the Japanese Patent Publication No. 7-151952, by using a two-group type zoom lens composed of a positive lens group and a negative lens group, a step type zoom lens stopping only at a plurality of predetermined lens positions is composed, which allows simplified construction by recording a trajectory of the focusing lens unit on a cam.

In other words, although the method (1) has a motor for zooming and a motor for focusing separately, the method (2) has only one motor used for both functions. Accordingly, the method (2) is preferable for compactness. However, it requires extremely high precision on the cam recording a trajectory of the focusing lens unit.

When the focusing according to the method (2) is performed in the Japanese Patent Publication No. 7-151952, a two-group type zoom lens composed of a positive lens group and a negative lens group is used. When a zoom ratio is to be enhanced, since stopping accuracy in the telephoto end state becomes extremely high, it is difficult to obtain required optical quality. Moreover, in a three-group type zoom lens, composed of a positive, a positive, and a negative lens group, used generally for a high zoom ratio zoom lens, it has been known that the method (2) is used for focusing near object. However, stopping accuracy required for obtaining predetermined optical quality cannot be realized because of complicated lens barrel structure.

SUMMARY OF THE INVENTION

The present invention is made in view of the aforementioned problems and has an object to provide a variable focal length lens system having simplified lens barrel structure with high quality and high zoom ratio.

According to one aspect of the present invention, a variable focal length lens system includes at least three lens groups, in order from an object side, a first lens group, a second lens group, and a third lens group. When a lens group positions are changed from a wide-angle end state (W) (which gives the shortest focal length) to a telephoto end state (T) (which gives the longest focal length), each lens group is moved through the following states in the following order;

a state focused at infinity in the wide-angle end state (W), a state focused at near object in the wide-angle end state (W), a state focused at infinity in an n-th focal length state (n=2, 3, 4, . . . ), a state focused at near object in the n-th focal length state, a state focused at infinity in the telephoto end state (T), and a state focused at near object in the telephoto end state (T).

The second lens group has an aperture stop, and lens elements are arranged to both object and image sides of the aperture stop.

When the lens group positions are changed from the wide-angle end state to the telephoto end state, the first and second lens groups are moved such that a moving ratio of the first lens group to the second lens group is always same or constant, and the third lens group is moved such that a space between the second and third lens groups is increased when a focusing state in a predetermined focal length changes from infinity to near object, and the space decreases when the focusing state is changed from said state focused at near object to a state focused at infinity in a neighboring focal length state.

BRIEF DESCRIPTION OF THE DRAWINGS

FIGS. 4A–4D are graphs showing various aberrations in the lens state (a) of the variable focal length lens system according to Example 1.

FIGS. 5A–5D are graphs showing various aberrations in the lens state (b) of the variable focal length lens system according to Example 1.

FIGS. 6A–6D are graphs showing various aberrations in the lens state (c) of the variable focal length lens system according to Example 1.

FIGS. 7A–7D are graphs showing various aberrations in the lens state (d) of the variable focal length lens system according to Example 1.

FIGS. 8A–8D are graphs showing various aberrations in the lens state (e) of the variable focal length lens system according to Example 1.

FIGS. 9A–9D are graphs showing various aberrations in the lens state (f) of the variable focal length lens system according to Example 1.

FIGS. 10A–10D are graphs showing various aberrations in the lens state (a') of the variable focal length lens system according to Example 1.

FIGS. 11A–11D are graphs showing various aberrations in the lens state (b') of the variable focal length lens system according to Example 1.

FIGS. 12A–12D are graphs showing various aberrations in the lens state (c') of the variable focal length lens system according to Example 1.

FIGS. 13A–13D are graphs showing various aberrations in the lens state (d') of the variable focal length lens system according to Example 1.

FIGS. 14A–14D are graphs showing various aberrations in the lens state (e') of the variable focal length lens system according to Example 1.

DESCRIPTION OF THE PREFERRED EMBODIMENTS

Figure 1:
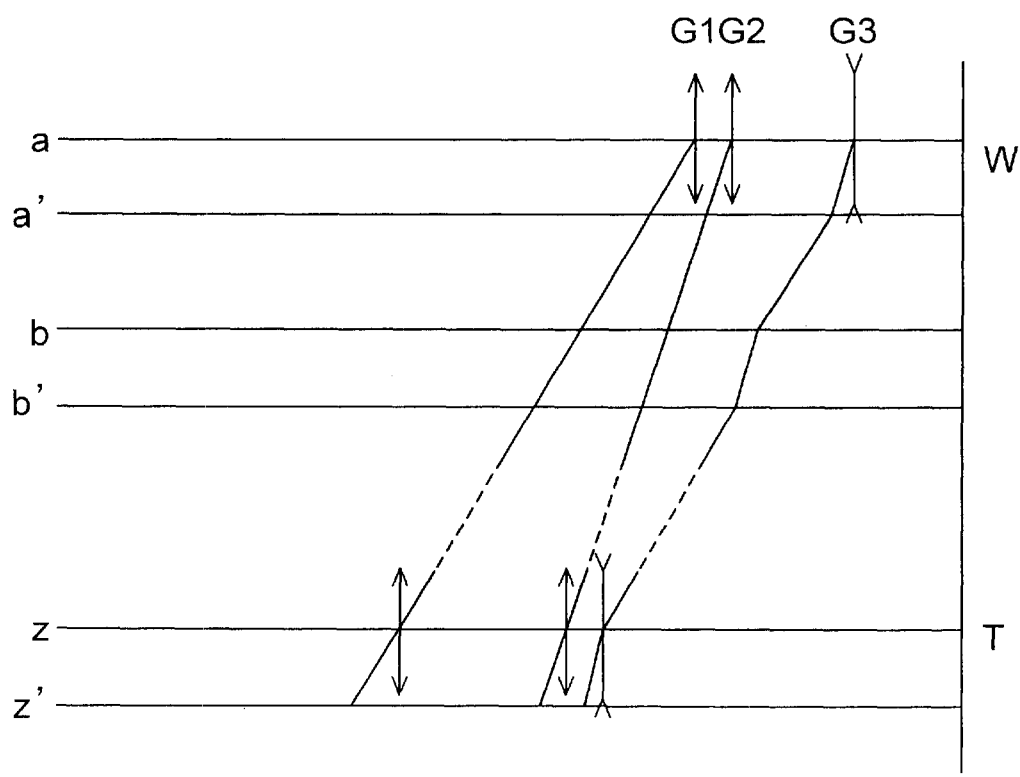
FIG. 1 is a diagram showing a distribution of refractive power in a variable focal length lens system according to the present invention.

A concept of the aforementioned focusing method (2) will be described with reference to FIG. 1. In FIG. 1, W denotes the wide-angle end state, and T denotes the telephoto end state. A variable focal length lens system includes, in order from the object side, a first lens group G1, a second lens group G2, and a third lens group G3, wherein when the lens group positions are changed from a wide-angle end state (W) at which a drive force is applied, to a telephoto end state (T), each lens group is moved through the following states in the following order:

a state (a) focused at infinity in the wide-angle end state (W), a state (a') focused at near object in the wide-angle end state (W), a state (b) focused at infinity in a second focal length state, a state (b') focused at near object in the second focal length state,

. . .

a state (z) focused at infinity in the telephoto end state (T), and a state (z') focused at near object in the telephoto end state (T).

In the following explanation, the infinity focusing states denoted by a, b, . . . , and z are called infinity stopping positions, and the near object focusing states denoted by a', b', . . . , and z' are called near object stopping positions.

A variable focal length lens system according to an embodiment of the present invention includes, in order from the object side, a first lens group G1, a second lens group G2, and a third lens group G3, wherein when the lens group positions are changed from a wide-angle end state (which gives the shortest focal length) to a telephoto end state (which gives the longest focal length), each lens group is moved through the following states in the following order:

an infinity stopping position in the wide-angle end state, a near object stopping position in the wide-angle end state, an infinity stopping position in a second focal length state, a near object stopping position in the second focal length state,

. . .

an infinity stopping position in an n-th focal length state, a near object stopping position in the n-th focal length state, an infinity stopping position in the telephoto end state, and a near object stopping position in the telephoto end state.

Moreover, by satisfying the following conditions (A) through (C), the structure of the lens barrel can be simplified and a compact, high quality zoom lens can be obtained.

(A) The first lens group G1 and the second lens group G2 are always moved with a constant moving ratio from the wide-angle end state to the telephoto end state.

(B) The third lens group G3 is moved such that when an infinity stopping position is changed to a near object stopping position in a predetermined focal length state, a space to the second lens group G2 increases, and when the near object stopping position in the certain focal length state is changed to an infinity stopping position in the adjacent next or neighboring focal length state, the space to the second lens group G2 decreases.

(C) An aperture stop is arranged in an appropriate position.

The above-described conditions (A) through (C) are going to be explained. A zoom lens has a merit for a photographer to make it possible to take a picture in accordance with his or her intention because of its ability to take such a picture taken from closer position to an object. The most important factor for a compact camera is good portability. The portability can be improved by using a motor both for zooming and focusing. However, if the stopping positions (a, a', b, b', . . . , z, z') become fewer, it is liable to happen that a photographer cannot take a picture in accordance with his or her intention. The present invention makes it possible to take a picture in accordance with the photographer's intention by arranging a lot of stopping positions between the wide-angle end state and the telephoto end state, and to improve portability.

Now, it is explained how to move each lens group consisting of the variable focal length lens system along the optical axis. When each lens group is moved along the optical axis, generally, one of lens barrels is rotated by rotational force of a motor, the rotational force is converted into a driving force along the optical axis, and, then, each lens group is moved along the optical axis. For converting the rotational force into the driving force along the optical axis, there is a mechanical element such as a helicoid or a cam.

As for the helicoid, a displacement along the optical axis relative to a rotation amount is constant. As for the cam, the displacement along the optical axis relative to a rotation amount can be varied by cam tracks, so that there is a merit that flexibility of correcting aberrations is enhanced. However, as for a non-linear cam whose inclination angle changes gradually, the driving force along the optical axis changes relative to the inclination angle, and accordingly it is disadvantageous that the stopping position is not stable. Therefore, if a plurality of non-linear cams are used, defocus caused by unevenness of the stopping accuracy is liable to happen.

In the present invention, the aforementioned condition (A) is satisfied, the zooming tracks are arranged such that the moving ratio of the first lens group G1 relative to the second lens group G2 is always constant, and the first lens group G1 and the second lens group G2 are arranged to be moved with a constant moving ratio even in focusing at near object. The first lens group G1 and the second lens group G2 are driven by helicoids or linear cams, and only the third lens group G3 is moved along a non-linear cam, so that defocus caused by unevenness of the stopping accuracy is suppressed.

When the third lens group G3 is moved to satisfy the condition (B) such that the space to the second lens group G2 is increased while the state of lens group positions is changed from an infinity stopping position to a near object stopping position in a predetermined focal length state, a moving amount of the first lens group G1 is relatively small. Accordingly, it is desirable that the lens groups are moved such that the space increases. When the state of lens group positions is changed from a near object stopping position in a predetermined focal length state to an infinity stopping position in the adjacent next or neighboring focal length state, the lens groups are moved such that the widened space decreases.

In the present invention, the arrangement of the aperture diaphragm S is particularly taken into consideration (condition (C)). In a variable focal length lens system with high zoom ratio, generally, an arrangement of the aperture diaphragm is extremely important, and it is ideal that the aperture diaphragm is arranged about middle of the lens system. This is because off-axis light flux passing through a lens group away from the aperture diaphragm S tends to pass away from the optical axis, and off-axis aberration produced by light flux passing away from the optical axis tends to become large.

Moreover, at least one movable lens group is arranged at each side, object side as well as image side, of the aperture diaphragm S, and a height of off-axis light flux passing through the movable lens group is actively changed by actively changing the distance between the aperture diaphragm S and the movable lens group, and, as a result, good imaging quality is obtained.

Particularly in the present invention, in order to satisfy high zoom ratio and high imaging quality at a same time, a lens group is arranged between the aperture diaphragm S and the movable lens group. Since lateral magnification of the movable lens group varies largely when changing a state of the lens positions, variation of coma and variation of on-axis aberration produced when changing a state of the lens positions are difficult to correct at a same time. Therefore, these aberrations are well corrected by arranging lenses between the aperture diaphragm S and the first lens group G1, and between the aperture diaphragm S and the third lens group G3.

Further, by moving all lens groups to the object side, the position of the exit pupil is separated from the image plane, off-axis light flux passing through the third lens group is actively varied, and variation of off-axis aberrations accompanied with changing a state of lens positions is well corrected.

Each conditional equation is now explained. In the present invention, the moving ratio of the second lens group G2 relative to the first lens group G1 is denoted by γ2. It is desirable to satisfy the following conditional equation;

$$0.6 < \gamma 2 < 0.85 \qquad (1).$$

Conditional equation (1) defines an appropriate range of the moving ratio of the second lens group G2 relative to the first lens group G1.

To make thinner the thickness of a camera body while collapsing (making shorter) the lens barrel, it is appropriate to shorten the total lens length and to make the thickness of each sub-lens barrel even. To simplify the lens barrel structure, it is desirable to construct such that each of the first G1 and second G2 lens group moves with the lens barrel. With this construction, the stopping accuracy of lens can be enhanced, so that a lens system having stable quality and accuracy is possible to be provided.

In the present invention, since the first lens group G1 and the second lens group G2 are moved with a constant moving ratio, the lens barrel structure can be simplified by appropriately arranging the moving ratio. When the value exceeds the upper limit or falls below the lower limit of the conditional equation (1), the compactness and the simplification of the lens barrel cannot be accomplished at a same time.

Furthermore, in the present invention, it is desirable that the moving amount of the first lens group required for focusing from a state focused at infinity to a state focused at predetermined finite object is larger in the telephoto end state than in the wide-angle end state.

In the above-mentioned Japanese Patent Publication No. 7-151952, the first lens group moves along the optical axis while focusing. In this case, the moving amount of the focusing lens group along the optical axis relative to the same object is almost same in the wide-angle end state and the telephoto end state. Therefore, the moving amount applied to zooming motor from a CPU is almost same.

Since the subject matter of the present invention is a multi-group zoom lens, variation of f-number according to the focal length is rather small, so that the depth of focus is wider in the wide-angle end state than in the telephoto end state. Since resolution is constant upon controlling motor drive, predetermined optical quality is maintained by setting a moving amount of a focusing lens group from a state focused at infinity to a state focused at near object wider in the telephoto end state than in the wide-angle end state.

However, if a moving amount of the first lens group G1 at a state focused at near object in the wide-angle end state is made to be small, the third lens group G3 moves excessively to the image side, so that an inclination angle of a cam driving the third lens group G3 along the optical axis becomes large. As a result, high stopping accuracy cannot be maintained. Accordingly, it is desirable that the moving amount of the first lens group G1 is slightly smaller in the telephoto end state than in the wide-angle end state.

Particularly, it is desirable that the moving amount of the first lens group G1 according to the present invention satisfies the following conditional equation (2);

$$1.0 < \Delta fw / \Delta ft \cdot Z < 1.6 \qquad (2)$$

where Δfw denotes the moving amount of the first lens group G1 from a state focused at infinity to a state focused at predetermined finite distant object in the wide-angle end state, Δft denotes the moving amount of the first lens group G1 from a state focused at infinity to a state focused at predetermined finite distant object in the telephoto end state, and Z denotes a zoom ratio.

When the value Δfw/Δft·Z exceeds the upper limit of the conditional equation (2), the moving amount for focusing in the wide-angle end state becomes large. In other words, a moving amount of each lens group to adjacent predetermined stopping position in the wide-angle end state becomes large. As a result, variation of the focal length becomes large, so that it is not preferable for a photographer to feel that something is wrong.

On the other hand, when the value falls below the lower limit of the conditional equation (2), the moving amount of the first lens group G1 for focusing in the telephoto end state becomes large, so that it is not desirable that the total lens length becomes excessively long.

Specifically, in the present invention, the first lens group G1 has a positive refractive power, the second lens group G2 has a positive refractive power, and the third lens group G3 has a negative refractive power. When a state of the lens group positions is changed from the wide-angle end state to the telephoto end state, it is desirable that the first, second and third lens groups move to the object side such that a space between the first lens group G1 and the second lens group G2 increases, and a space between the second lens group G2 and the third lens group G3 decreases.

Moreover, in the present invention, it is desirable to satisfy the following conditional equation (3) in order to enhance stopping accuracy of the third lens group G3, and to provide a variable focal length lens system having stable and high optical quality;

$$\beta 3w > 1.45 \tag{3}$$

where Δ3w denotes lateral magnification of the third lens group G3 in the wide-angle end state. Conditional equation (3) defines an appropriate range of the lateral magnification of the third lens group in the wide-angle end state.

When one lens group is moved for focusing at near object, the moving amount is depending on image plane moving magnification. The image plane moving magnification of the third lens group G3 in the wide-angle end state Δ3w is represented by the following equation;

$$\Delta 3w = (\beta 3w)^2 - 1.$$

When β3w is smaller than the square root of 2, the image plane moving magnification becomes smaller than 1, and the moving amount becomes large. In this case, although the third lens group G3 moves to the image plane side along a cam groove formed inside wall of the lens barrel, the lens barrel having the cam groove moves to the object side, so that the moving amount of the third lens group G3 relative to the lens barrel becomes extremely large. In other words, since the inclination angle of the cam becomes large, the stopping accuracy of the third lens group G3 is extremely deteriorated, so that it is liable to cause defocusing. Therefore, high quality lens products cannot be provided to a market.

Moreover, in order to make the lens system to be compact in its entirety, it is more desirable that the upper limit of conditional equation (3) is to be 1.8. When the value β3w exceeds the upper limit 1.8, the total lens length in the telephoto end state becomes large.

Furthermore, in the present invention, it is desirable to satisfy the following conditional equation (4) in order to keep balance of compactness with high quality;

$$0.7 < (\beta 3t/\beta 3w)/Z < 0.9 \tag{4}$$

where β3t denotes lateral magnification of the third lens group G3 in the telephoto end state, β3w denotes lateral magnification of the third lens group G3 in the wide-angle end state, and Z denotes a zoom ratio.

Conditional equation (4) defines an appropriate range of variation in the lateral magnification of the third lens group G3. When the value (β3t/β3w)/Z exceeds the upper limit of conditional equation (4), variation of off-axis aberration produced by the third lens group G3 while changing the lens position cannot be corrected well. On the other hand, when the value falls below the lower limit of the conditional equation (4), off-axis light flux passing through the first lens group G1 in the telephoto end state passes away from the optical axis, so that the diameter of the lens system becomes large, and large off-axis aberration is produced too. As a result, high quality lens system cannot be obtained.

Moreover, in the present invention, since the first lens group G1 and the second lens group G2 move with a constant moving ratio, this is a restriction on the optical design. Although this restriction is relaxed by appropriately arranging the aperture diaphragm S, in order to obtain higher quality lens system, it is desirable that the first lens group G1 consists of a cemented positive lens L1 composed of a double convex lens and a negative lens having a concave surface facing to the object side, and the following conditional equation (5) is satisfied;

$$2.5 < |r1s|/D1t < 5.0 \tag{5}$$

where r1s denotes a radius of curvature of the cemented surface in the first lens group G1, and D1t denotes a space between the first lens group G1 and the second lens group G2 in the telephoto end state.

Conditional equation (5) defines an appropriate range of the radius of curvature of the cemented surface in the first lens group G1. Off-axis light flux passing through the first lens group G1 has a large incident angle in the wide-angle end state, and gradually changes to a smaller incident angle when approaching to the telephoto end state. However, incident ray height rapidly separates from the optical axis when the focal length state moves from the wide-angle end state to the telephoto end state.

When the value |r1s|/D1t falls below the lower limit of the conditional equation (5), high order chromatic aberration is undesirably produced to off-axis light flux on approaching to the telephoto end state from the wide-angle end state. On the other hand, when the value exceeds the upper limit of the conditional equation (5), chromatic aberration produced by the first lens group G1 alone cannot be corrected well. Moreover, since off-axis light flux passing through the first lens group G1 does not change while the state of lens positions changes from the wide-angle end state to the telephoto end state, variation in off-axis aberration in accordance with change in lens positions cannot be corrected.

Furthermore, in the present invention, it is desirable that a moving ratio of the third lens group G3 relative to the first lens group G1 in the state focused at near object is to be nearly constant from each infinity stopping position to each near object stopping position existing between the wide-angle end state and the telephoto end state. Accordingly, unevenness of lens stopping position caused by the inclination angle of a cam can be made constant, so that a lens system having stable quality can be provided.

Further, in the present invention, it is desirable to satisfy the following conditional equation (6) in order to obtain excellent quality from a state focused at infinity to a state focused at near object;

$$0.4 < \gamma 2 \cdot (f2/f1) < 0.9 \tag{6}$$

where f1 denotes the focal length of the first lens group G1, f2 denotes the focal length of the second lens group G2, and γ2 denotes the moving ratio of the second lens group G2 relative to the first lens group G1.

Conditional equation (6) connects the moving ratio of the second lens group G2 relative to the first lens group G1 and a focal length ratio between the first lens group G1 and the second lens group G2.

When the focal length of the first lens group G1 relative to that of the second lens group G2 becomes small, variation of the space between the first lens group G1 and the second lens group G2 while changing from the wide-angle end state to the telephoto end state, is small. In other words, variation in off-axis aberration produced while changing focal length can sufficiently be corrected even if the moving ratio between the first lens group G1 and the second lens group G2 is large. The larger the focal length of the first lens group G1 relative to that of the second lens group G2, the more actively the space between the first lens group G1 and the second lens group G2 has to be changed.

Therefore, in order to make the lens system to have high quality, it is important to balance the moving ratio of the second lens group G2 relative to the first lens group G1 with the focal length ratio between the first lens group G1 and the second lens group G2.

When the value γ2·(f2/f1) exceeds the upper limit of the conditional equation (6), variation in the space between the first lens group G1 and the second lens group G2 is not sufficient, so that positive field curvature produced in accordance with change in lens positions cannot be corrected well. On the other hand, when the value falls below the lower limit of the conditional equation (6), variation in the space between the first lens group G1 and the second lens group G2 becomes excessive, so that negative field curvature produced in accordance with change in lens positions cannot be corrected enough.

Furthermore, in the present invention, it is desirable that lenses in the second lens group G2 arranged to the object side of the aperture diaphragm S have negative refractive power as a whole, and lenses in the second lens group G2 arranged to the image side of the aperture diaphragm S have positive refractive power as a whole.

The reason is that sufficient back focal length is retained in the wide-angle end state, so that positive distortion can be corrected well. Since incident angle of off-axis light flux is large in the wide-angle end state, if the back focal length is short, off-axis light flux passing through the third lens group G3 passes away from the optical axis, so that the diameter of the lens system becomes large. Moreover, since refractive power of the first lens group is positive and refractive power of the third lens group is negative, positive distortion is liable to be produced. Production of positive distortion is suppressed by arranging refractive power of the second lens group such that negative refractive power is arranged to the object side and positive refractive power is arranged to the image side.

NUMERICAL EXAMPLES

Numerical examples of the variable focal length lens system according to the present invention will be explained below. In each example, an aspherical surface is expressed by the following equation;

$$x = cy^2/\{1+(1-Kc^2y^2)^{1/2}\} + C4y^4 + C6y^6 + \ldots$$

where y denotes the height in a vertical direction to the optical axis, x denote sag amount, c denotes radius of curvature, K denotes the conical coefficient, C4, C6, . . . denote aspherical coefficient.

FIG. 1 is a diagram showing distribution of refractive power of a variable focal length lens system according to each example of the present invention. A lens system consists of three lens groups, in order from an object side, a first lens group G1 having positive refractive power, a second lens group G2 having positive refractive power, and a third lens group G3 having negative refractive power, wherein when the state of lens positions changes from a wide-angle end state (which gives the shortest focal length) to a telephoto end state (which gives the longest focal length), all the lens groups moves to the object side such that a space between the first lens group G1 and the second lens group G2 increases, and a space between the second lens group G2 and the third lens group G3 decreases.

As explained later, although graphs for aberrations are presented only for Example 1, good optical qualities are obtained for both of Example 2 and Example 3.

Example 1

Figure 2:
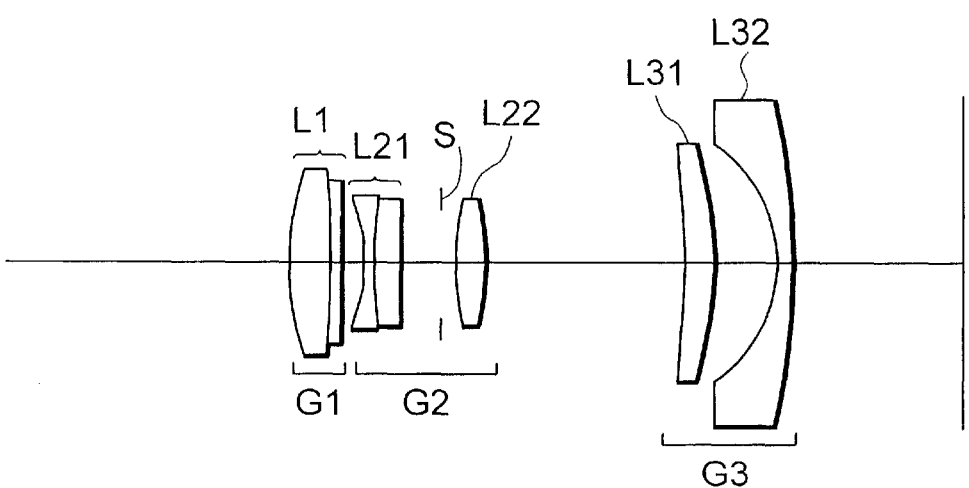
FIG. 2 is a view schematically showing the configuration of a variable focal length lens system according to Example 1 of the present invention.

FIG. 2 is a view schematically showing the configuration of a variable focal length lens system according to Example 1 of the present invention. The first lens group G1 consists of a cemented positive lens L1 composed of a double convex lens and a negative meniscus lens having a concave surface facing to the object side. The second lens group G2 consists of, in order from the object side, a negative cemented lens L21 composed of a double concave lens and a double convex lens, and a double convex lens L22. The third lens group G3 consists of a positive lens L31 having a convex surface facing to the image side, and a negative lens L32 having a concave surface facing to the object side and arranged to the image side of the lens L31 separated with an air space. The negative cemented lens L21 is a negative sub lens group, the double convex lens L22 is a positive sub lens group, and an aperture diaphragm S is arranged in between.

Figure 3:
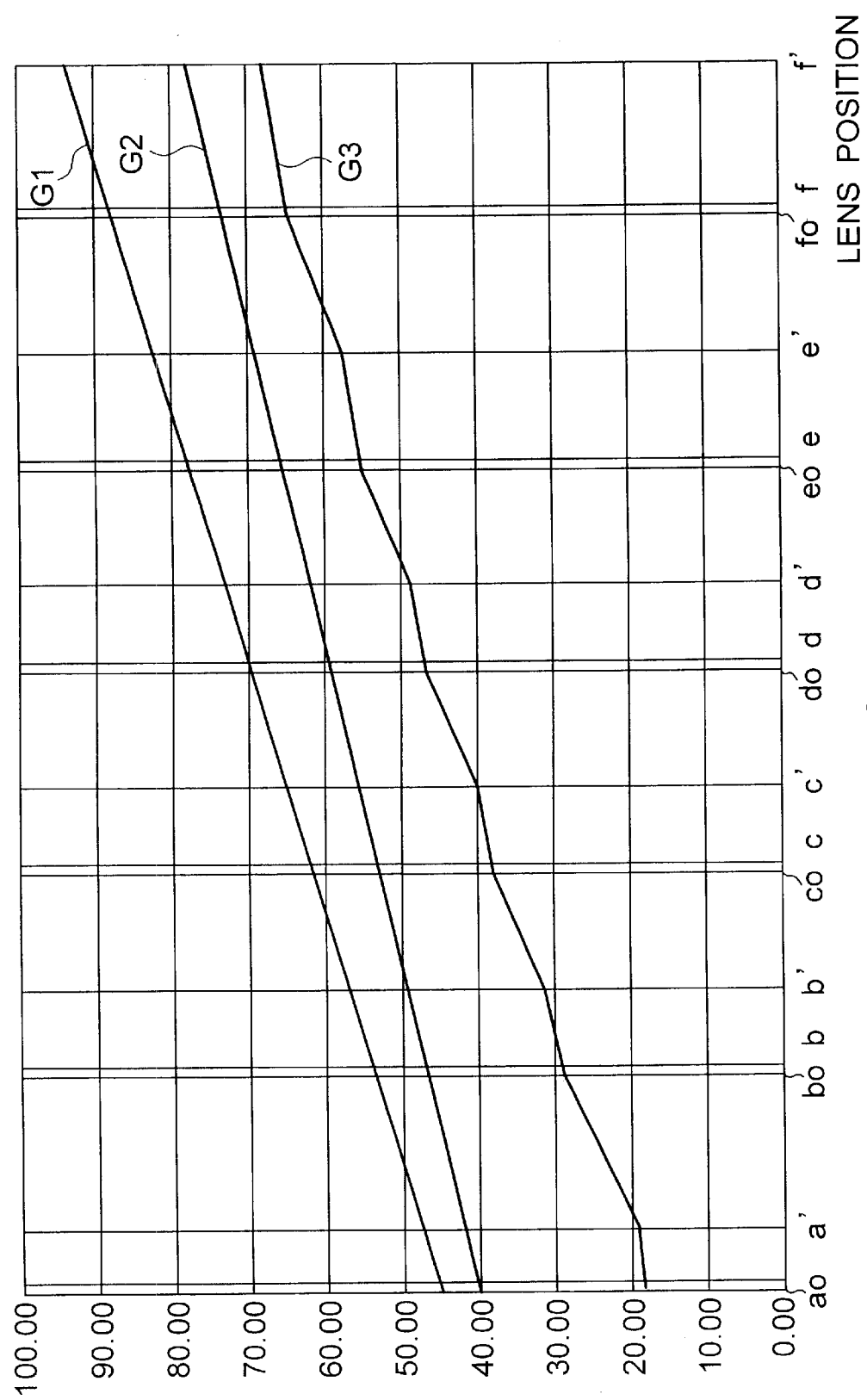
FIG. 3 is a diagram showing a trajectory of each lens group of the variable focal length lens system according to Example 1.
Figures 15A, 15B, 15C, 15D:
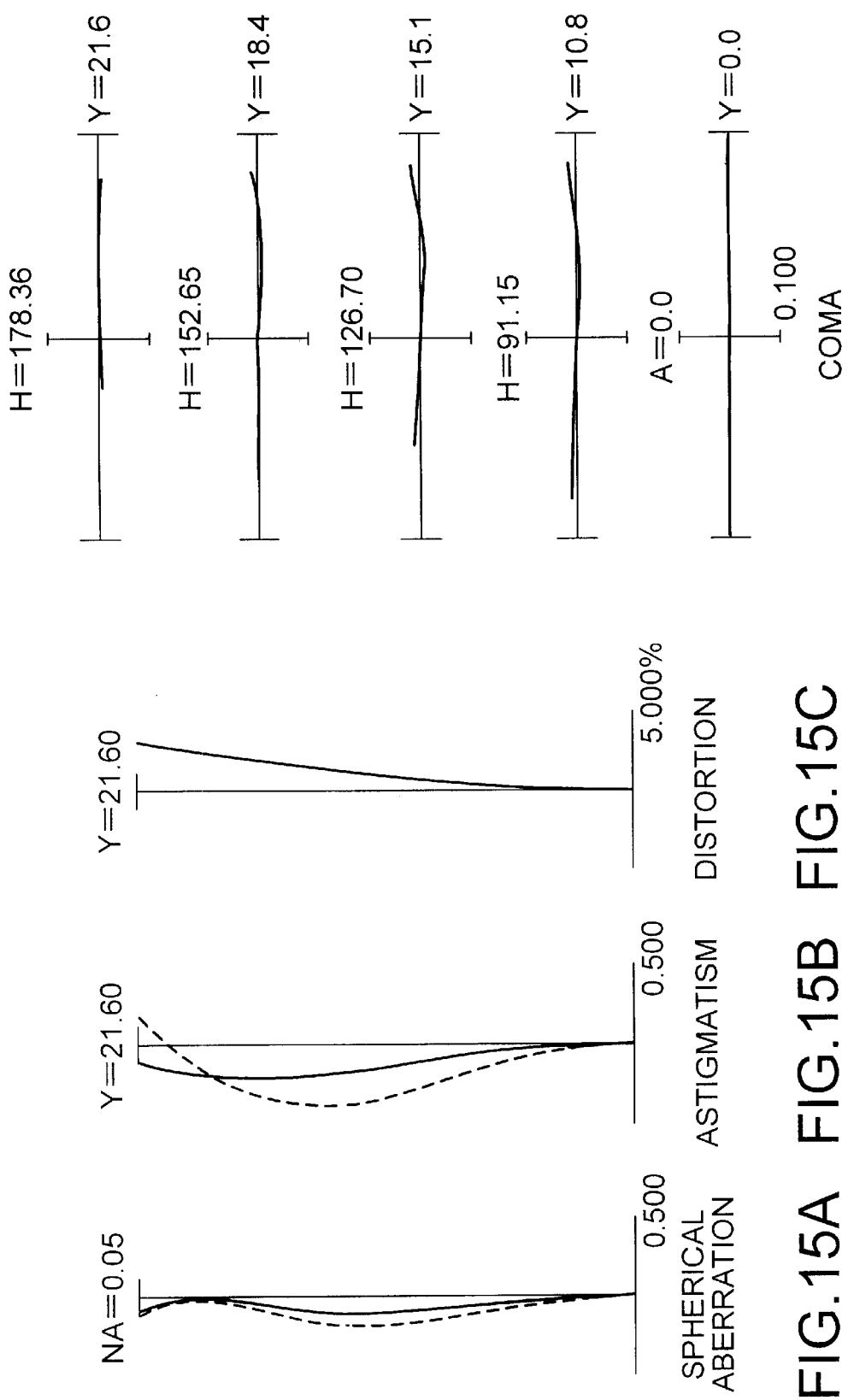
FIGS. 15A–15D are graphs showing various aberrations in the lens state (f') of the variable focal length lens system according to Example 1.

FIG. 3 is a diagram showing a trajectory of each lens group of the variable focal length lens system according to Example 1. In FIG. 3, a horizontal axis shows a lens position and a vertical axis shows moving amount of each lens group. In lens positions;

(a) denotes a state focused at infinity in the wide-angle end state (infinity stopping position).

(b) denotes a state focused at infinity in the second focal length state.

(c) denotes a state focused at infinity in the third focal length state.

(d) denotes a state focused at infinity in the fourth focal length state.

(e) denotes a state focused at infinity in the fifth focal length state.

(f) denotes a state focused at infinity in the telephoto end state.

Moreover, each of a0, b0, c0, d0, e0, f0 denotes reference position in each focal length state described above. Each of a', b', c', d', e', f' denotes a state focused at near object (0.8 m) in each focal length state described above. Here, each interval of a0 to a, b0 to b, c0 to c, d0 to d, e0 to e, f0 to f denotes each run-up section. Focusing distance becomes shorter in each interval a to a', b to b', c to c', d to d', e to e', f to f'.

Various values associated with Example 1 are listed in Table 1. In Table 1, f denotes the focal length, FNO denotes the f-number, and 2ω denotes an angle of view. In addition, values indicated as the refractive index are values for the d-line (λ=587.6 nm). In various values and in aberration graphs explained later, a unit of length is mm.

TABLE 1

| lens position | a | b | c | d | e | f |
|---|---|---|---|---|---|---|
| f | 39.90 | 55.32 | 68.29 | 81.29 | 96.14 | 114.00 |
| FNO | 5.77 | 7.55 | 8.83 | 9.94 | 10.96 | 12.00 |
| 2ω | 55.37° | 41.09° | 33.99° | 28.81° | 24.68° | 20.94° |

| surface number | radius of curvature | interval between surfaces | refractive index | Abbe number |
|---|---|---|---|---|
| 1 | 21.9665 | 2.80 | 1.49700 | 81.61 |
| 2 | −39.0600 | 0.80 | 1.72825 | 28.46 |
| 3 | −88.2420 | (D3) | 1.0 | |
| 4 | −15.9690 | 0.80 | 1.80400 | 46.58 |
| 5 | 40.0900 | 1.70 | 1.62004 | 36.26 |
| 6 | −87.7678 | 2.80 | 1.0 | |
| 7 | 0.0000 | 1.00 | 1.0 | aperture diaphragm |
| 8 | 28.5112 | 2.00 | 1.51450 | 63.05 |
| 9 | −13.4581 | (D10) | 1.0 | |
| 10 | −53.0174 | 2.10 | 1.68649 | 30.90 |
| 11 | −27.0855 | 4.10 | 1.0 | |
| 12 | −9.8404 | 1.00 | 1.75500 | 52.32 |
| 13 | −54.2614 | (Bf) | 1.0 | |

Aspherical surface data of the aspherical surfaces, 8, 11 and 12.

| surface number | 8 | 11 | 12 |
|---|---|---|---|
| κ | −0.1752 | 0.3695 | 8.3423 |
| C4 | +2.2259 × 10⁻⁵ | +5.4725 × 10⁻⁵ | +2.4363 × 10⁻⁵ |
| C6 | +8.0907 × 10⁻⁷ | +1.6955 × 10⁻⁶ | +2.1095 × 10⁻⁶ |
| C8 | −3.1970 × 10⁻⁸ | −4.0319 × 10⁻⁸ | −4.2466 × 10⁻⁸ |
| C10 | +1.3268 × 10⁻¹⁰ | +1.8950 × 10⁻¹⁰ | +1.8050 × 10⁻¹⁰ |

Variable intervals during zooming

| lens position | a | b | c | d | e | f |
|---|---|---|---|---|---|---|
| f | 39.8970 | 55.3185 | 68.2946 | 81.6337 | 96.1350 | 114.0025 |
| D3 | 1.3000 | 3.1053 | 4.7499 | 6.4316 | 8.1998 | 10.2648 |
| D10 | 13.1199 | 8.9428 | 6.5599 | 4.6290 | 2.8716 | 1.0000 |
| BF | 11.3193 | 22.3767 | 31.0278 | 39.3686 | 47.8661 | 57.6094 |

Moving ratio γ2 and γ3 of each lens group G2 and G3 relative to G1

| | a | b | c | d | e | f |
|---|---|---|---|---|---|---|
| f | 39.8970 | 55.3185 | 68.2946 | 81.6337 | 96.1350 | 114.0025 |
| γ2 | 0.7922 | 0.7922 | 0.7922 | 0.7922 | 0.7922 | 0.7922 |
| γ3 | 0.4918 | 0.5503 | 0.5059 | 0.5164 | 0.5448 | 0.6009 |

Moving amount of each lens group focusing up to 1 m

| | a | b | c | d | e | f |
|---|---|---|---|---|---|---|
| f | 39.8970 | 55.3185 | 68.2946 | 81.6337 | 96.1350 | 114.0025 |
| G1 | 1.2126 | 1.6736 | 1.7637 | 1.9904 | 2.2612 | 2.9392 |
| G2 | 0.9606 | 1.3258 | 1.3971 | 1.5767 | 1.7912 | 2.3284 |
| G3 | 0.5964 | 0.9209 | 0.8922 | 1.0279 | 1.2071 | 1.7662 |

Values for conditions f1 = 40.3318
f2 = 40.3926
f3 = −20.5685
(1) γ2 = 0.792
(2) Δfw/Δft · Z = 1.179
(3) β3w = 1.549
(4) (β3t/β3w)/Z = 0.859
(5) |rls|/D1 = 3.530
(6) γ2 · (f2/f1) = 0.793

FIGS. 4 through 15 are graphs showing various aberrations associated with Example 1. FIGS. 4 through 9 show various aberrations of each lens position, a through f, in the state focused at infinity. FIGS. 10 through 15 show various aberrations of each lens position, a through f, in the state focused at near object.

In FIGS. 4 through 15, in the diagram showing spherical aberration, a solid line indicates spherical aberration, a broken line indicates the sine condition, and Y denotes image height. In the diagram showing astigmatism, a solid line indicates a sagittal image plane, a broken line indicates a meridional image plane, and d indicates aberration for d-line (λ=587.6 nm). In the diagram showing coma, coma relative to the image height Y=0, 10.8, 15.2, 18.34, and 21.6 are shown. A denotes an angle of view. H denotes an object height.

As is apparent from the respective diagrams showing the various aberrations, excellent correction is made for the various aberrations at the respective focal lengths.

Example 2

Figure 16:
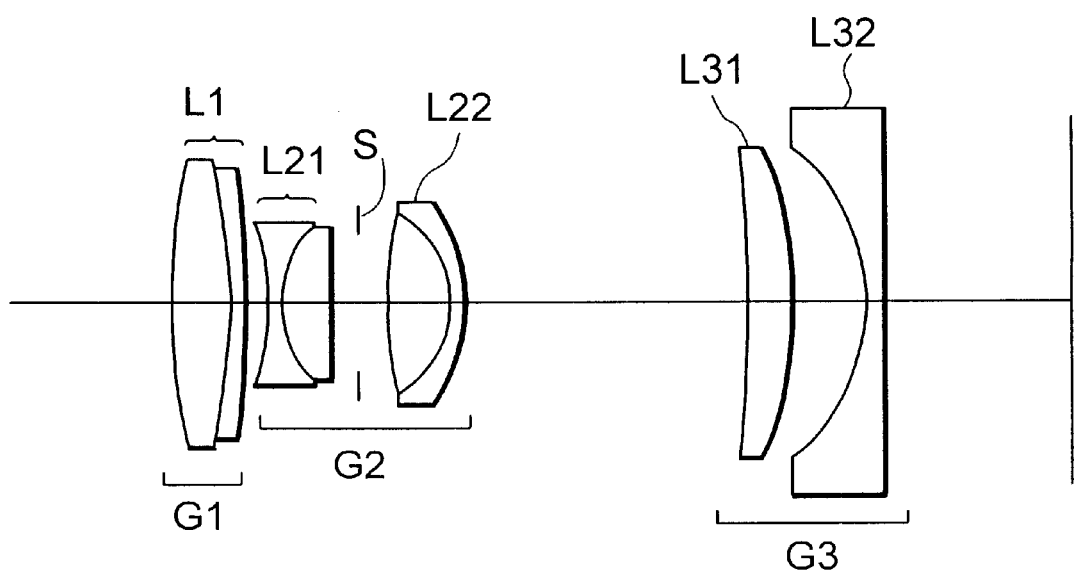
FIG. 16 is a view schematically showing the configuration of a variable focal length lens system according to Example 2 of the present invention.

FIG. 16 is a view schematically showing the configuration of a variable focal length lens system according to Example 2 of the present invention. The first lens group G1 consists of a cemented positive lens L1 composed of a double convex lens and a negative meniscus lens having a concave surface facing to the object side. The second lens group G2 consists of, in order from the object side, a negative cemented lens L21 composed of a double concave lens and a double convex lens, and a positive cemented lens L22 composed of a double convex lens and a negative meniscus lens having a concave surface facing to the object side. The third lens group G3 consists of a positive lens L31 having a convex surface facing to the image side, and a negative lens L32 having a concave surface facing to the object side and arranged to the image side of the lens L31 separated with an air space.

The negative cemented lens L21 is a negative sub lens group, the positive cemented lens L22 is a positive sub lens group, and an aperture diaphragm S is arranged in between.

Figure 17:
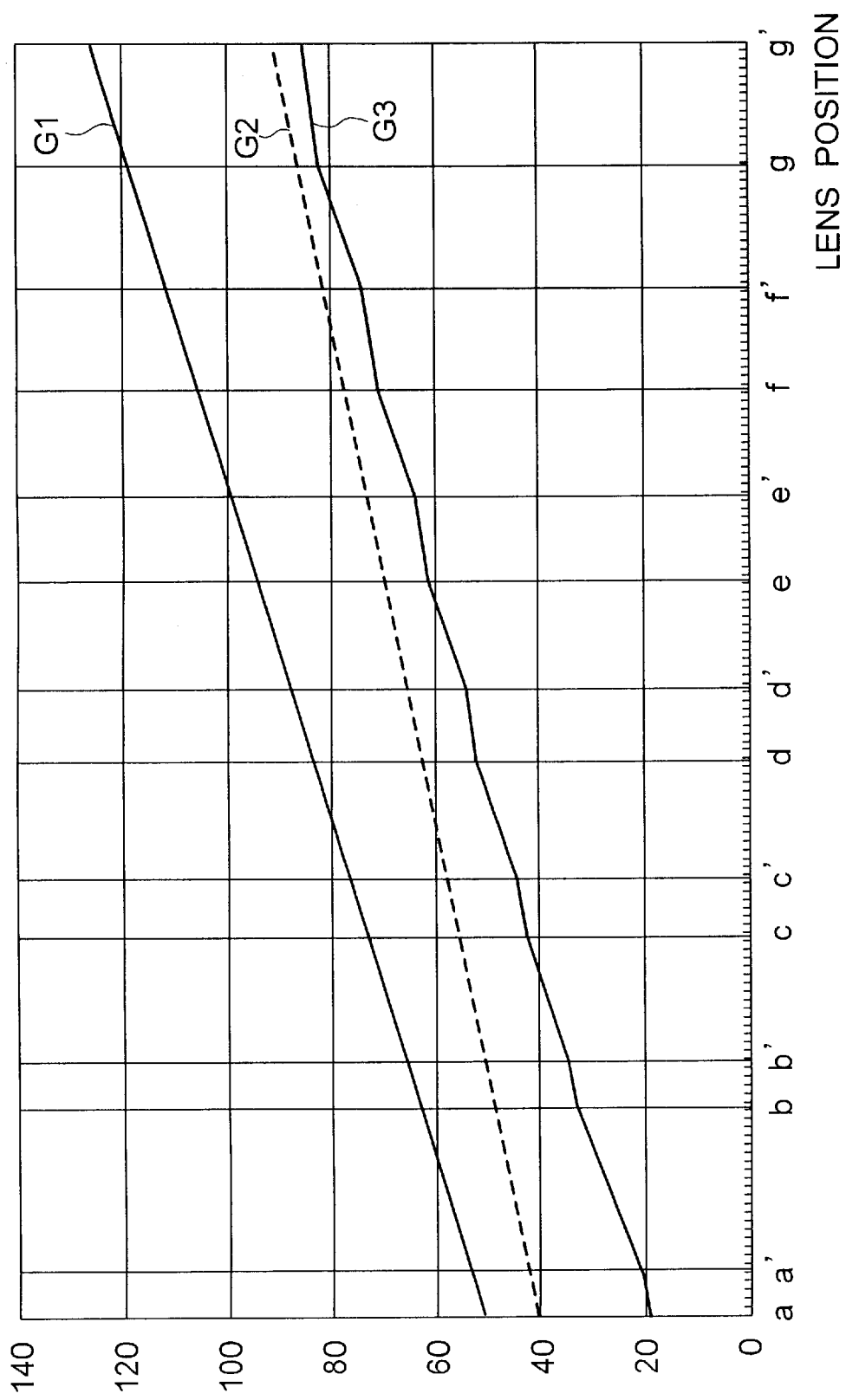
FIG. 17 is a diagram showing a trajectory of each lens group of the variable focal length lens system according to Example 2.

FIG. 17 is a diagram showing a trajectory of each lens group of the variable focal length lens system according to Example 2. In FIG. 17;

(a) denotes a state focused at infinity in the wide-angle end state (infinity stopping position).

(b) denotes a state focused at infinity in the second focal length state.

(c) denotes a state focused at infinity in the third focal length state.

(d) denotes a state focused at infinity in the fourth focal length state.

(e) denotes a state focused at infinity in the fifth focal length state.

(f) denotes a state focused at infinity in the sixth focal length state.

(g) denotes a state focused at infinity in the telephoto end state.

Moreover, each of a', b', c', d', e', f', g' denotes a state focused at near object (0.8 m) in each focal length state described above. Focusing distance becomes shorter in each interval a to a', b to b', c to c', d to d', e to e', f to f', g to g'.

Various values associated with Example 2 are listed in Table 2.

TABLE 2

| lens position | a | b | c | d | e | f | g |
|---|---|---|---|---|---|---|---|
| f | 39.90 | 58.69 | 73.19 | 88.94 | 107.22 | 126.84 | 152.47 |
| FNO | 5.00 | 6.88 | 8.08 | 9.18 | 10.32 | 11.13 | 12.00 |
| 2ω | 54.85° | 38.99° | 31.84° | 26.50° | 22.18° | 18.83° | 15.72° |

| surface number | radius of curvature | interval between surfaces | refractive index | Abbe number |
|---|---|---|---|---|
| 1 | 44.2160 | 3.50 | 1.49700 | 81.61 |
| 2 | −33.8062 | 0.80 | 1.74950 | 35.04 |
| 3 | −65.3430 | (D3) | 1.0 | |
| 4 | −17.4773 | 0.80 | 1.80610 | 40.73 |
| 5 | 6.6145 | 3.00 | 1.80610 | 33.27 |
| 6 | −751.7838 | 1.70 | 1.0 | |
| 7 | 0.0000 | 1.90 | 1.0 | aperture diaphragm |
| 8 | 28.2598 | 3.80 | 1.51450 | 63.05 |
| 9 | −6.6027 | 0.80 | 1.74950 | 35.04 |
| 10 | −10.3878 | (D10) | 1.0 | |
| 11 | −137.5720 | 2.80 | 1.68893 | 31.16 |
| 12 | −31.0043 | 4.50 | 1.0 | |
| 13 | −12.1228 | 1.00 | 1.75500 | 52.32 |
| 14 | 1000.0020 | (B) | 1.0 | |

Aspherical surface data of the aspherical surfaces, 8, 11 and 12.

| surface number | 8 | 11 | 12 |
|---|---|---|---|
| κ | 11.0000 | 1.0000 | 1.0000 |
| C4 | $-1.1387 \times 10^{-4}$ | $+3.4195 \times 10^{-5}$ | $-6.5248 \times 10^{-6}$ |
| C6 | $+1.7090 \times 10^{-7}$ | $-2.2486 \times 10^{-7}$ | $-3.1778 \times 10^{-7}$ |
| C8 | $-8.6011 \times 10^{-9}$ | $+7.8689 \times 10^{-9}$ | $+9.1662 \times 10^{-9}$ |
| C10 | $+8.3707 \times 10^{-10}$ | $-1.2675 \times 10^{-10}$ | $-1.3875 \times 10^{-10}$ |

Variable intervals during zooming

| | a | b | c | d | e | f | g |
|---|---|---|---|---|---|---|---|
| f | 39.8981 | 58.6884 | 73.1915 | 88.9449 | 107.2166 | 126.8367 | 152.4672 |
| D3 | 1.3000 | 5.0934 | 8.2545 | 11.5738 | 14.7622 | 18.6865 | 22.7960 |
| D10 | 17.1109 | 11.4627 | 8.7951 | 6.6222 | 4.6728 | 2.8048 | 0.7641 |
| BF | 11.2099 | 25.0647 | 34.5709 | 43.9251 | 54.1517 | 63.1300 | 74.0611 |

Moving ratio γ2 and γ3 of each lens group G2 and G3 relative to G1

| | a | b | c | d | e | f | g |
|---|---|---|---|---|---|---|---|
| f | 39.8981 | 58.6884 | 73.1915 | 88.9449 | 107.2166 | 126.8367 | 152.4672 |
| γ2 | 0.6839 | 0.6839 | 0.6839 | 0.6839 | 0.6839 | 0.6839 | 0.6839 |
| γ3 | 0.5738 | 0.3386 | 0.4384 | 0.4818 | 0.4721 | 0.4894 | 0.4946 |

Moving amount of each lens group foausing up to 0.8 m

| | a | b | c | d | e | f | g |
|---|---|---|---|---|---|---|---|
| f | 39.8981 | 58.6884 | 73.1915 | 88.9449 | 107.2166 | 126.8367 | 152.4672 |
| G1 | 2.5000 | 2.5000 | 3.5000 | 4.5000 | 5.0000 | 6.0000 | 7.0000 |
| G2 | 1.7097 | 1.7097 | 2.3935 | 3.0775 | 3.4194 | 4.1033 | 4.7872 |
| G3 | 1.4344 | 0.8466 | 1.5345 | 2.1682 | 2.3603 | 2.9362 | 3.4622 |

Values for conditions f1 = 66.1572
f2 = 35.3519
f3 = −24.2464
(1) γ2 = 0.684
(2) Δfw/Δft · Z = 1.365
(3) β3w = 1.415
(4) (β3t/β3w)/Z = 0.859
(5) |rls|/D1 = 4.448
(6) γ2 · (f2/f1) = 0.459

Example 3

Figure 18:
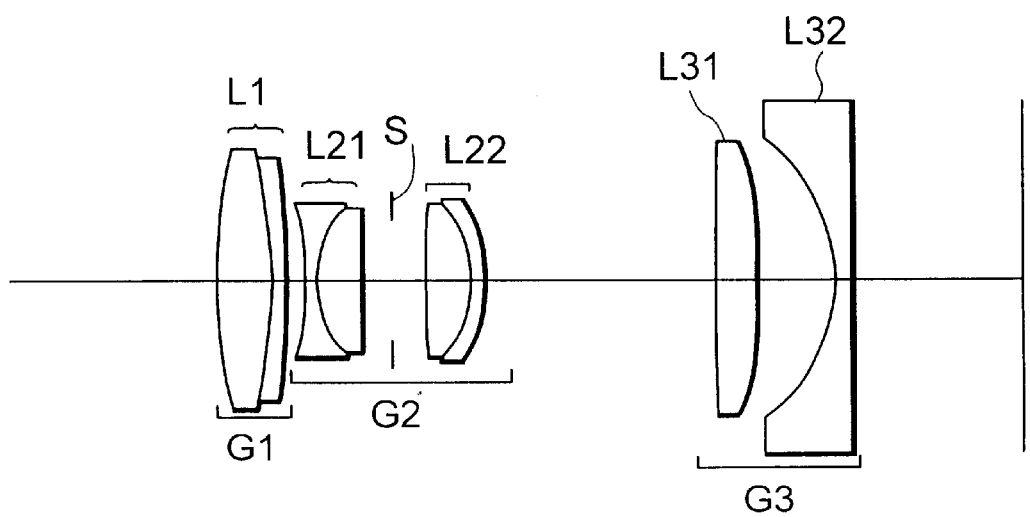
FIG. 18 is a view schematically showing the configuration of a variable focal length lens system according to Example 3 of the present invention.

FIG. 18 is a view schematically showing the configuration of a variable focal length lens system according to Example 3 of the present invention. The first lens group G1 consists of a cemented positive lens L1 composed of a double convex lens and a negative meniscus lens having a concave surface facing to the object side. The second lens group G2 consists of, in order from the object side, a negative cemented lens L21 composed of a double concave lens and a double convex lens, and a positive cemented lens L22 composed of a double convex lens and a negative meniscus lens having a concave surface facing to the object side. The third lens group G3 consists of a positive lens L31 having a convex surface facing to the image side, and a negative lens L32 having a concave surface facing to the object side and arranged to the image side of the lens L31 separated by an air space.

The negative cemented lens L21 is a negative sub lens group, the positive cemented lens L22 is a positive sub lens group, and an aperture diaphragm S is arranged in between.

Figure 19:
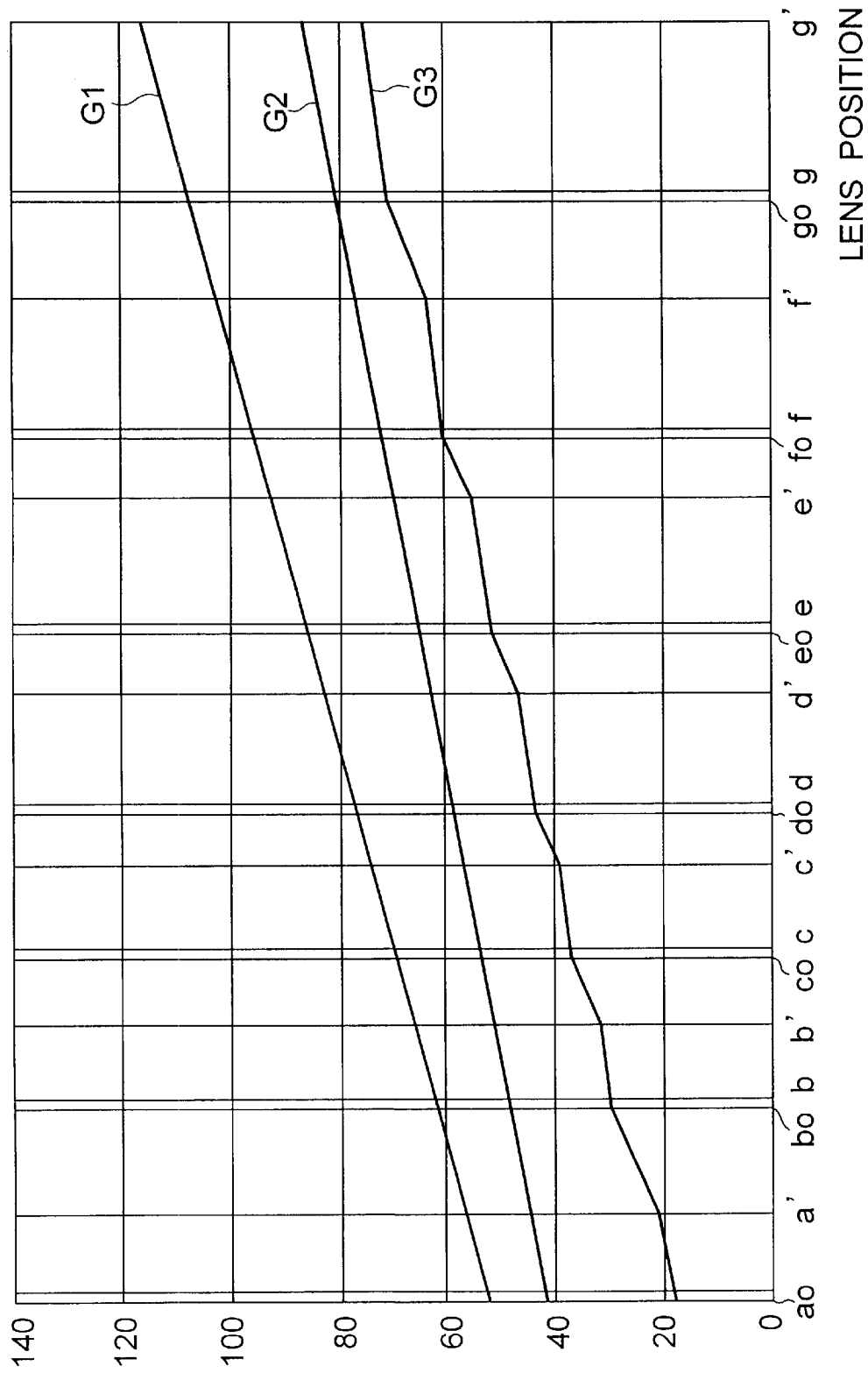
FIG. 19 is a diagram showing a trajectory of each lens group of the variable focal length lens system according to Example 3.

FIG. 19 is a diagram showing a trajectory of each lens group of the variable focal length lens system according to Example 3. In FIG. 19, each of a, b, c, d, e, f, g denotes each focal length state as shown in Example 2. Moreover, each of a0, b0, c0, d0, e0, f0 denotes reference position in each focal length state described above. Each of a', b', c', d', e', f' denotes a state focused at near object (0.8 m) in each focal length state described above. Here, each interval of a0 to a, b0 to b, c0 to c, d0 to d, e0 to e, f0 to f denotes each run-up section. Focusing distance becomes shorter in each interval a to a', b to b', c to c', d to d', e to e', f to f'.

Various values associated with Example 3 are listed in Table 3.

TABLE 3

| lens position | a | b | c | d | e | f | g |
|---|---|---|---|---|---|---|---|
| f | 36.60 | 52.62 | 62.76 | 75.19 | 90.03 | 107.80 | 133.00 |
| FNO | 5.11 | 6.93 | 7.86 | 8.87 | 9.88 | 10.92 | 12.00 |
| 2ω | 59.24° | 42.99° | 38.63° | 30.98° | 26.14° | 22.01° | 19.95° |

| surface number | radius of curvature | interval between surfaces | refractive index | Abbe number |
|---|---|---|---|---|
| 1 | 33.7165 | 3.40 | 1.49700 | 81.61 |
| 2 | −31.6.639 | 0.80 | 1.80610 | 33.27 |
| 3 | −59.8997 | (D3) | 1.0 | |
| 4 | −17.9127 | 0.80 | 1.83400 | 37.35 |
| 5 | 6.1763 | 2.85 | 1.71736 | 29.50 |
| 6 | −50.6011 | 1.90 | 1.0 | |
| 7 | 0.0000 | 2.10 | 1.0 | aperture diaphragm |
| 8 | 40.3264 | 3.00 | 1.51450 | 63.05 |
| 9 | −7.1815 | 0.80 | 1.80518 | 25.46 |
| 10 | −9.4761 | (D10) | 1.0 | |
| 11 | 982.0645 | 2.75 | 1.68893 | 31.16 |
| 12 | −44.8123 | 4.95 | 1.0 | |
| 13 | −10.7517 | 1.00 | 1.75500 | 52.32 |
| 14 | −840.6133 | (Bf) | 1.0 | |

Aspherical surface data of the aspherical surfaces, 8, 11 and 12.

| surface number | 8 | 11 | 12 |
|---|---|---|---|
| κ | −3.6946 | 11.0000 | −0.6255 |
| C4 | −5.2623 × $10^{-5}$ | +2.0592 × $10^{-5}$ | −3.9639 × $10^{-6}$ |
| C6 | −2.0181 × $10^{-7}$ | −2.2486 × $10^{-7}$ | +2.5900 × $10^{-7}$ |
| C8 | +3.0244 × $10^{-8}$ | −3.8811 × $10^{-9}$ | −1.9120 × $10^{-9}$ |
| C10 | −7.5987 × $10^{-11}$ | −1.3334 × $10^{-10}$ | −1.3334 × $10^{-10}$ |

Variable intervals during zooming

| | a | b | c | d | e | f | g |
|---|---|---|---|---|---|---|---|
| f | 36.5992 | 52.6238 | 62.7582 | 75.1898 | 90.0309 | 107.7978 | 133.0000 |
| D3 | 1.3000 | 3.9507 | 6.1316 | 8.5450 | 11.2893 | 14.0822 | 17.7807 |
| D10 | 14.5266 | 9.9790 | 8.0891 | 6.2863 | 4.5479 | 2.8587 | 0.8000 |
| BF | 10.7513 | 22.4198 | 28.8572 | 36.2464 | 44.2409 | 53.1373 | 64.0658 |

Moving ratio γ2 and γ3 of each lens group G2 and G3 relative to G1

| | a | b | c | d | e | f | g |
|---|---|---|---|---|---|---|---|
| f | 36.5992 | 52.6238 | 62.7582 | 75.1898 | 90.0309 | 107.7978 | 133.0000 |
| γ2 | 0.7061 | 0.7061 | 0.7061 | 0.7061 | 0.7061 | 0.7061 | 0.7061 |
| γ3 | 0.6105 | 0.5144 | 0.5278 | 0.5313 | 0.5299 | 0.5070 | 0.5115 |

TABLE 3-continued

| | Moving amount of each lens group focusing up to 0.8 m | | | | | | |
|---|---|---|---|---|---|---|---|
| | a | b | c | d | e | f | g |
| f | 36.5992 | 52.6238 | 62.7582 | 75.1898 | 90.0309 | 107.7978 | 133.0000 |
| G1 | 2.0000 | 2.5000 | 3.0000 | 3.5000 | 4.0000 | 4.2500 | 5.0000 |
| G2 | 1.4090 | 1.7711 | 2.1154 | 2.4087 | 2.8733 | 3.0267 | 3.5304 |
| G3 | 1.2209 | 1.2884 | 2.2167 | 2.7596 | 2.6622 | 2.1549 | 2.5574 |

Values for conditions
f1 = 54.7022
f2 = 30.7498
f3 = −20.9857
(1) $\gamma2$ = Q0706
(2) $\Delta fw/\Delta ft \cdot Z$ = 1.454
(3) $\beta 3w$ = 1.459
(4) $(\beta 3t/\beta 3w)/Z$ = 0.754
(5) $|rls|/D1$ = 4.139
(6) $\gamma 2 \cdot (f2/f1)$ = 0.423

Further, although graphs for various aberrations in accordance with Examples 2 and 3 are abbreviated, as described before, various aberrations are excellently corrected like Example 1, and good imaging quality is obtained.

While the present invention has been described in connection with preferred embodiment, it will be understood that it is not so limited. On the contrary, it is intended to cover all alternatives, modifications and equivalents as may be included within the spirit and scope of the invention as defined in the appended claims.

What is claimed is:

1. A variable focal length lens system comprising, in order from an object side:

a first lens group;

a second lens group; and a third lens group;

wherein when a lens group positions are changed from a wide-angle end state which gives the shortest focal length to a telephoto end state which gives the longest focal length, each lens group is moved through the followings states in the following order:

a state focused at infinity in the wide-angle end state, a state focused at near object in the wide-angle end state, a state focused at infinity in an n-th focal length state (n=2, 3, 4, . . . ), a state focused at near object in the n-th focal length state, a state focused at infinity in the telephoto end state, and a state focused at near object in the telephoto end state; and wherein the second lens group has an aperture diaphragm, and lens elements are arranged to both object and image sides of the aperture diaphragm;

when the lens group positions are changed from the wide-angle end state to the telephoto end state, the first and second lens groups are moved such that a moving ratio of the first lens group to the second lens group is always same; and the third lens group is moved such that;

a space between the second lens group and the third lens group increases when a focusing state in a predetermined focal length is changed from infinity to near object, and the space decreases when the focusing state is changed from said state focused at near object to a state focused at infinity in a neighboring focal length state.

2. A variable focal length lens system according to claim 1, wherein the following conditional equation is satisfied;

$$0.6<\gamma 2<0.85$$

where $\gamma 2$ denotes a moving ratio of the second lens group relative to the first lens group.

3. A variable focal length lens system according to claim 2, wherein the following conditional equation is satisfied;

$$1.0<\Delta fw/\Delta ft \cdot Z<1.6$$

where $\Delta fw$ denotes a moving amount of the first lens group from a state focused at infinity to a state focused at near object in the wide-angle end state, $\Delta ft$ denotes a moving amount of the first lens group G1 from a state focused at infinity to a state focused at near object in the telephoto end state, and Z denotes a zoom ratio.

4. A variable focal length lens system according to claim 3, wherein;

the first lens group has a positive refractive power;

the second lens group has a positive refractive power; and the third lens group has a negative refractive power; and wherein the following conditional equation is satisfied;

$$\beta 3w>1.45$$

where $\beta 3w$ denotes lateral magnification of the third lens group in the wide-angle end state.

5. A variable focal length lens system according to claim 4, wherein the following conditional equation is satisfied;

$$0.7<(\beta 3t/\beta 3w)/Z<0.9$$

where $\beta 3t$ denotes lateral magnification of the third lens group in the telephoto end state, $\beta 3w$ denotes lateral magnification of the third lens group in the wide-angle end state, and Z denotes a zoom ratio.

6. A variable focal length lens system according to claim 4, wherein the first lens group consists of a cemented positive lens composed of a double convex lens and a negative lens having a concave surface facing to an object side; and wherein the following conditional equation is satisfied;

$$2.5 < |r1s|/D1t < 5.0$$

where r1s denotes a radius of curvature of the cemented surface in the first lens group, and D1t denotes a space between the first lens group and the second lens group in the telephoto end state.

7. A variable focal length lens system according to claim 4, wherein the following conditional equation is satisfied;

$$0.4 < \gamma 2 \cdot (f2/f1) < 0.9$$

where f1 denotes a focal length of the first lens group, f2 denotes a focal length of the second lens group, and γ2 denotes a moving ratio of the second lens group relative to the first lens group.

8. A variable focal length lens system according to claim 3, wherein the following conditional equation is satisfied;

$$0.4 < \gamma 2 \cdot (f2/f1) < 0.9$$

where f1 denotes a focal length of the first lens group, f2 denotes a focal length of the second lens group, and γ2 denotes a moving ratio of the second lens group relative to the first lens group.

9. A variable focal length lens system according to claim 2, wherein;
the first lens group has a positive refractive power;
the second lens group has a positive refractive power; and
the third lens group has a negative refractive power; and
wherein the following conditional equation is satisfied;

$$\beta 3w > 1.45$$

where β3w denotes lateral magnification of the third lens group in the wide-angle end state.

10. A variable focal length lens system according to claim 9, wherein the following conditional equation is satisfied;

$$0.7 < (\beta 3t/\beta 3w)/Z < 0.9$$

where β3t denotes lateral magnification of the third lens group in the telephoto end state, β3w denotes lateral magnification of the third lens group in the wide-angle end state, and Z denotes a zoom ratio.

11. A variable focal length lens system according to claim 10, wherein the first lens group consists of a cemented positive lens composed of a double convex lens and a negative lens having a concave surface facing to an object side; and
wherein the following conditional equation is satisfied;

$$2.5 < |r1s|/D1t < 5.0$$

where r1s denotes a radius of curvature of the cemented surface in the first lens group, and D1t denotes a space between the first lens group and the second lens group in the telephoto end state.

12. A variable focal length lens system according to claim 9, wherein the first lens group consists of a cemented positive lens composed of a double convex lens and a negative lens having a concave surface facing to an object side; and
wherein the following conditional equation is satisfied;

$$2.5 < |r1s|/D1t < 5.0$$

where r1s denotes a radius of curvature of the cemented surface in the first lens group, and D1t denotes a space between the first lens group and the second lens group in the telephoto end state.

13. A variable focal length lens system according to claim 9, wherein the following conditional equation is satisfied;

$$0.4 < \gamma 2 \cdot (f2/f1) < 0.9$$

where f1 denotes a focal length of the first lens group, f2 denotes a focal length of the second lens group, and γ2 denotes a moving ratio of the second lens group relative to the first lens group.

14. A variable focal length lens system according to claim 2, wherein the following conditional equation is satisfied;

$$0.4 < \gamma 2 \cdot (f2/f1) < 0.9$$

where f1 denotes a focal length of the first lens group, f2 denotes a focal length of the second lens group, and γ2 denotes a moving ratio of the second lens group relative to the first lens group.

15. A variable focal length lens system according to claim 1, wherein;
the first lens group has a positive refractive power;
the second lens group has a positive refractive power; and
the third lens group has a negative refractive power; and
wherein the following conditional equation is satisfied;

$$\beta 3w > 1.45$$

where β3w denotes lateral magnification of the third lens group in the wide-angle end state.

16. A variable focal length lens system according to claim 15, wherein the following conditional equation is satisfied;

$$0.7 < (\beta 3t/\beta 3w)/Z < 0.9$$

where β3t denotes lateral magnification of the third lens group in the telephoto end state, β3w denotes lateral magnification of the third lens group in the wide-angle end state, and Z denotes a zoom ratio.

17. A variable focal length lens system according to claim 16, wherein the first lens group consists of a cemented positive lens composed of a double convex lens and a negative lens having a concave surface facing to an object side; and
wherein the following conditional equation is satisfied;
ti 2.5<|r1s|/D1t<5.0 where r1s denotes a radius of curvature of the cemented surface in the first lens group, and D1t denotes a space between the first lens group and the second lens group in the telephoto end state.

18. A variable focal length lens system according to claim 15, wherein the first lens group consists of a cemented positive lens composed of a double convex lens and a negative lens having a concave surface facing to an object side; and
wherein the following conditional equation is satisfied;

$$2.5 < |r1s|/D1t < 5.0$$

where r1s denotes a radius of curvature of the cemented surface in the first lens group, and D1t denotes a space between the first lens group and the second lens group in the telephoto end state.

19. A variable focal length lens system according to claim 15, wherein the following conditional equation is satisfied;

$$0.4 < \gamma 2 \cdot (f2/f1) < 0.9$$

where f1 denotes a focal length of the first lens group, f2 denotes a focal length of the second lens group, and γ2 denotes a moving ratio of the second lens group relative to the first lens group.

20. A variable focal length lens system according to claim 1, wherein the following conditional equation is satisfied;

$$0.4 < \gamma 2 \cdot (f2/f1) < 0.9$$

where f1 denotes a focal length of the first lens group, f2 denotes a focal length of the second lens group, and γ2 denotes a moving ratio of the second lens group relative to the first lens group.

* * * * *

UNITED STATES PATENT AND TRADEMARK OFFICE
CERTIFICATE OF CORRECTION

PATENT NO. : 6,333,822 B1
DATED : December 25, 2001
INVENTOR(S) : Motoyuki Ohtake It is certified that error appears in the above-identified patent and that said Letters Patent is hereby corrected as shown below:

<u>Title page,</u>
Item [30], Foreigh Application Priority Data should read:
-- Aug. 9, 1999 (JP) ........................ 11-225544
Jul. 24, 2000 (JP) ......................... 2000-221848 --

Signed and Sealed this

Twenty-first Day of May, 2002

*Attest:*

JAMES E. ROGAN
*Attesting Officer*     *Director of the United States Patent and Trademark Office*